(12) United States Patent
Chowdhury et al.

(10) Patent No.: US 11,791,890 B1
(45) Date of Patent: Oct. 17, 2023

(54) CONVERGED DATA COMMUNICATIONS IN SATELLITE NETWORKS

(71) Applicant: Stitel Networks, LLC, Tempe, AZ (US)

(72) Inventors: Noor A Chowdhury, Tempe, AZ (US); Nahid Hossain, Tempe, AZ (US)

(73) Assignee: Stitel Networks, LLC, Tempe, AZ (US)

( * ) Notice: Subject to any disclaimer, the term of this patent is extended or adjusted under 35 U.S.C. 154(b) by 0 days.

(21) Appl. No.: 17/347,297

(22) Filed: Jun. 14, 2021

Related U.S. Application Data

(63) Continuation of application No. 16/291,404, filed on Mar. 4, 2019, now Pat. No. 11,038,585, which is a
(Continued)

(51) Int. Cl.
| | |
|---|---|
| *H04B 7/185* | (2006.01) |
| *H04L 41/0813* | (2022.01) |
| *H04L 9/40* | (2022.01) |
| *H04L 43/0876* | (2022.01) |
| *H04L 41/0806* | (2022.01) |
| *H04W 24/02* | (2009.01) |

(Continued)

(52) U.S. Cl.
CPC ..... *H04B 7/18513* (2013.01); *H04L 41/0806* (2013.01); *H04L 41/0813* (2013.01); *H04L 43/0876* (2013.01); *H04L 63/1433* (2013.01); *H04W 24/02* (2013.01); *H04L 43/0829* (2013.01); *H04L 43/0864* (2013.01); *H04W 84/06* (2013.01)

(58) Field of Classification Search
CPC ........... H04B 7/18513; H04L 41/0806; H04L 41/0813; H04L 43/0876; H04L 63/1433; H04L 43/0829; H04L 43/0864; H04W 24/02; H04W 84/06
See application file for complete search history.

(56) References Cited

U.S. PATENT DOCUMENTS

| | | | |
|---|---|---|---|
| 7,100,187 B2 | 8/2006 | Pierzga et al. | |
| 7,187,927 B1 | 3/2007 | Mitchell et al. | |

(Continued)

FOREIGN PATENT DOCUMENTS

| | | |
|---|---|---|
| CN | 103036607 | 4/2013 |
| EP | 1796332 | 4/2007 |

OTHER PUBLICATIONS

Ian Corbert, "What data compression does to your music", Apr. 2012.

*Primary Examiner* — Mounir Moutaouakil
(74) *Attorney, Agent, or Firm* — Fish & Richardson P.C.

(57) ABSTRACT

In some implementations, a satellite communication system is a capable of utilizing converged data transmissions over a satellite network to improve various aspects of services provisioned through the satellite network. For example, the system includes multiple electronic components that operate within a common software application framework to enable the ability to perform monitored operations in real-time. The system uses the monitored data to dynamically and intelligently adjust network configurations of the satellite network configuration to dynamically and intelligently improve to the provisioning of network-based services under varying network conditions.

20 Claims, 24 Drawing Sheets

Related U.S. Application Data continuation of application No. 15/898,301, filed on Feb. 16, 2018, now Pat. No. 10,225,000, which is a continuation of application No. 15/618,293, filed on Jun. 9, 2017, now Pat. No. 9,900,082.

(60) Provisional application No. 62/349,391, filed on Jun. 13, 2016.

(51) Int. Cl.
  *H04L 43/0829* (2022.01)
  *H04W 84/06* (2009.01)
  *H04L 43/0864* (2022.01)

(56) References Cited

U.S. PATENT DOCUMENTS

| | | | |
|---|---|---|---|
| 7,343,157 B1 | 3/2008 | Mitchell et al. | |
| 8,402,268 B2 | 3/2013 | Dierickx et al. | |
| 9,215,008 B2 | 12/2015 | Hastings, Jr. et al. | |
| 9,326,217 B2 * | 4/2016 | Lauer | H04L 12/189 |
| 9,346,562 B2 | 5/2016 | Wolfe et al. | |
| 9,369,991 B2 * | 6/2016 | Lauer | H04W 72/0453 |
| 9,397,745 B2 | 7/2016 | Jalali et al. | |
| 9,402,182 B1 | 7/2016 | Henzl et al. | |
| 9,462,300 B2 | 10/2016 | Couleaud et al. | |
| 9,480,010 B2 | 10/2016 | Kaba et al. | |
| 9,516,352 B2 | 12/2016 | Keen et al. | |
| 9,577,857 B2 * | 2/2017 | Lauer | H04B 7/18506 |
| 9,634,753 B2 | 4/2017 | Lauer et al. | |
| 9,647,748 B1 | 5/2017 | Mitchell et al. | |
| 9,787,619 B2 * | 10/2017 | Lauer | H04L 51/214 |
| 9,872,154 B2 | 1/2018 | Margis et al. | |
| 9,900,823 B2 | 2/2018 | Lauer et al. | |
| 9,949,155 B2 | 4/2018 | Lin et al. | |
| 9,967,020 B2 | 5/2018 | Kanabar et al. | |
| 10,171,531 B2 * | 1/2019 | Velayudhan | H04L 67/06 |
| 10,362,609 B2 * | 7/2019 | Perng | H04L 67/12 |
| 10,861,119 B2 | 12/2020 | Keen et al. | |
| 11,038,585 B1 | 6/2021 | Chowdhury et al. | |
| 11,182,768 B2 * | 11/2021 | Fowler | G06Q 20/387 |
| 11,206,432 B1 * | 12/2021 | Fowler | G06Q 30/0237 |
| 11,399,267 B2 * | 7/2022 | Natwick | H04W 72/0453 |
| 2003/0217363 A1 | 11/2003 | Brady | |
| 2007/0086485 A1 | 4/2007 | Vega-Garcia | |
| 2009/0003570 A1 | 1/2009 | Sindhwani et al. | |
| 2009/0077595 A1 | 3/2009 | Sizelove et al. | |
| 2009/0257345 A1 | 10/2009 | King et al. | |
| 2010/0142482 A1 | 6/2010 | Lu et al. | |
| 2010/0281100 A1 | 11/2010 | Benco et al. | |
| 2011/0116482 A1 | 5/2011 | Ansari et al. | |
| 2011/0286325 A1 | 11/2011 | Jalali et al. | |
| 2011/0302309 A1 | 12/2011 | Chen et al. | |
| 2013/0034026 A1 | 2/2013 | Sobota et al. | |
| 2014/0282684 A1 | 9/2014 | Keen et al. | |
| 2015/0040228 A1 | 2/2015 | Lee et al. | |
| 2015/0381741 A1 | 12/2015 | Dowlatkhah et al. | |
| 2016/0006500 A1 | 1/2016 | Radpour et al. | |
| 2016/0119845 A1 | 4/2016 | Lu et al. | |
| 2016/0234281 A1 | 8/2016 | Padnnanabhan et al. | |
| 2016/0241619 A1 | 8/2016 | Slater et al. | |
| 2017/0085420 A1 | 3/2017 | Singh et al. | |
| 2017/0127323 A1 | 5/2017 | Peleg et al. | |
| 2017/0238047 A1 | 8/2017 | Cox et al. | |
| 2017/0295069 A1 | 10/2017 | Sweet et al. | |
| 2017/0295094 A1 | 10/2017 | Jackson et al. | |
| 2019/0053062 A1 | 2/2019 | Wang et al. | |
| 2020/0106822 A1 | 4/2020 | Roncero Izquierdo et al. | |

* cited by examiner

CONVERGED DATA COMMUNICATIONS IN SATELLITE NETWORKS

CROSS-REFERENCE TO RELATED APPLICATIONS

This application is a continuation of U.S. application Ser. No. 16/291,404, filed Mar. 4, 2019, now allowed, which is a continuation of U.S. application Ser. No. 15/898,301, filed Feb. 16, 2018, now U.S. Pat. No. 10,225,000, issued Mar. 5, 2019, which is a continuation of U.S. application Ser. No. 15/618,293, filed Jun. 9, 2017, now U.S. Pat. No. 9,900,082, issued Feb. 20, 2018, which claims the benefit of U.S. Provisional Application No. 62/349,391, filed Jun. 13, 2016, and titled "Converged Data Communications in Satellite Networks." All of these prior applications are incorporated by reference in their entirety.

FIELD

The present specification is related generally to converged data communications and the transfer of packet data in satellite networks.

BACKGROUND

Communication technologies use channels to transmit information over either a physical medium such as signal cables, or in the form of electromagnetic waves. In particular, communications satellite relay and amplify radio telecommunications signals via a transponder by creating a communication channel between a source transmitter and a ground receiver.

SUMMARY

Although numerous satellite-based aviation communication networks currently exist to facilitate the transmission of packet data from air to the ground, such technologies often use multiple disjointed platforms and components. In aviation communications, where business requirements include delivery of end-to-end data in a seamless, secure, intelligent and cost-effective manner, such networks often exhibit inadequate performance for end-users.

In some implementations, a satellite communication system is a capable of utilizing converged data transmissions over a satellite network to improve various aspects of services provisioned through the satellite network. For example, the system includes multiple electronic components that operate within a common software application framework to enable the ability to perform monitored operations in real-time. The system uses the monitored data to dynamically and intelligently adjust network configurations of the satellite network configuration to dynamically and intelligently improve to the provisioning of network-based services under varying network conditions.

The system generally includes an air segment that includes electronic components that are on board an aircraft, and a terrestrial segment that includes electronic components that are configured to provide monitoring and support features to enable the provisioning of services through a satellite network. For example, the air segment can include one or more computing devices of users on board the aircraft, and a cabin communication module that includes a cabin router and a cabin modem to enable connectivity to the satellite network. The terrestrial segment can include a terrestrial communication station that exchanges communications with the cabin communication module, a network operation station that monitors activity of the satellite network, and multiple satellite communications (SATCOM) provider systems that are configured to provision services over the satellite network.

Implementations may include one or more of the following features. For example, a computer-implemented method may include the operations of: receiving, from a computing device on board an aircraft, data indicating a network connection request over a satellite network. The method can also include configuring a cabin router on board the aircraft to grant access to the computing device to a particular network access point from among multiple network access points of the satellite network. The particular network access point can enable the computing device to exchange data transmissions with a terrestrial communication station over the satellite network.

The method can include the operations of obtaining, from the cabin router, data indicating a connection event of computing device to the particular network access point, and performing set of operations while the computing device is connected to the particular network access point. The operations performed while the computing device is connected to the particular network access point can include: obtaining, from a satellite communication system, monitoring data of the satellite network. The satellite communication system can include a plurality of devices configured to exchange converged data transmissions over the satellite network. The monitoring data of the satellite network is collected in real-time by one or more of the plurality of devices configured to exchange converged data transmissions over the satellite network.

The operations performed while the computing device is connected to the particular network access point can also include determining that the monitoring data satisfies one or more criteria associated with the satellite network, and adjusting a network configuration associated with the computing device based at least on the obtained monitoring data.

Implementations can include one or more of the following optional features. For example, in some implementations, the obtained monitoring data of the satellite network indicates a change in available bandwidth over the network access point of the satellite network; and adjusting the network configuration associated with the computing device includes adjusting a dynamic bandwidth allocation over the network access point assigned to the computing device.

In some implementations, determining that the monitoring data satisfies the one or more criteria associated with the satellite network includes determining that the particular network access point is currently disconnected from the satellite network; and adjusting the network configuration associated the computing device includes reconfiguring the cabin router to grant access a different network access point from among the multiple network access points of the satellite network to the computing device.

In some implementations, the data indicating a network connection request over the satellite network includes a request by the computing device to initiate a voice call over the satellite network; and configuring the cabin router to grant access to the particular network access point includes configuring the cabin router to initiate the voice call requested by the computing device over the particular network access point.

In some implementations, the monitoring data of the satellite network indicates a call quality monitored in real-time over the particular network access point, determining that the monitoring data satisfies the one or more criteria associated with the satellite network includes determining that the monitored call quality does not to satisfy a threshold call quality, adjusting the network configuration associated with the computing devices includes increasing a dynamic bandwidth allocation assigned to the computing device over the particular network access point.

In some implementations, the method can additionally include the operation of dynamically encoding audio data corresponding to the voice call over the satellite network using a particular audio codec, the particular audio codec enabling at least a variable sampling rate of the audio data based on the obtained monitoring data of the satellite network.

In some implementations, the method can further include the operations of scanning the satellite network for set of predetermined security vulnerabilities in real-time; determining that one or more security vulnerabilities from among the predetermined security vulnerabilities presently impact network performance of the plurality of network access points of the satellite network; assigning a respective severity score to each of the one or more determined security vulnerabilities; and storing, in a database associated with the satellite communication system, data indicating the one or more determining security vulnerabilities and the respective severity scores assigned to each security vulnerability.

In some implementations, the satellite communication system is configured to provision telecommunication services to a first aviation service provider and a second aviation service provider. In such implementations, the first aviation service provider using a first set of communication devices associated with a first hardware configuration; the second aviation service provider using a set second of communication devices associated with a second hardware configuration, the second hardware configuration employing a different communication protocol than a communication protocol employed by the first hardware configuration.

In another general aspect, a satellite communication system is capable of enabling converged data transmissions over a satellite network. The satellite communication system can include: one or more computing device on board an aircraft and configured to access one or more network access points of the satellite network; a cabin router on board the aircraft and configured to enable the one or more computing devices to access a particular network access point from among the one or more network access points of the satellite network; an airborne communication gateway device configured to enable data transmissions over the satellite network with the cabin router; and a terrestrial communication station. The terrestrial communication station can further include: a terrestrial communication interface configured to exchange data transmissions with the cabin router through the airborne communication gateway device, a network operations module configured to monitor network activity over the one or more network access points of the satellite network in real-time, and a connectivity service module configured to provision telecommunication services to a plurality of third-party aviation service providers.

Other implementations of these aspects include corresponding systems, apparatus and computer programs, configured to perform the actions of the methods, encoded on computer storage devices.

The details of one or more implementations are set forth in the accompanying drawings and the description below. Other potential features and advantages will become apparent from the description, the drawings, and the claims.

BRIEF DESCRIPTION OF THE DRAWINGS

In the drawings, like reference numbers represent corresponding parts throughout.

DETAILED DESCRIPTION

Figure 1A:
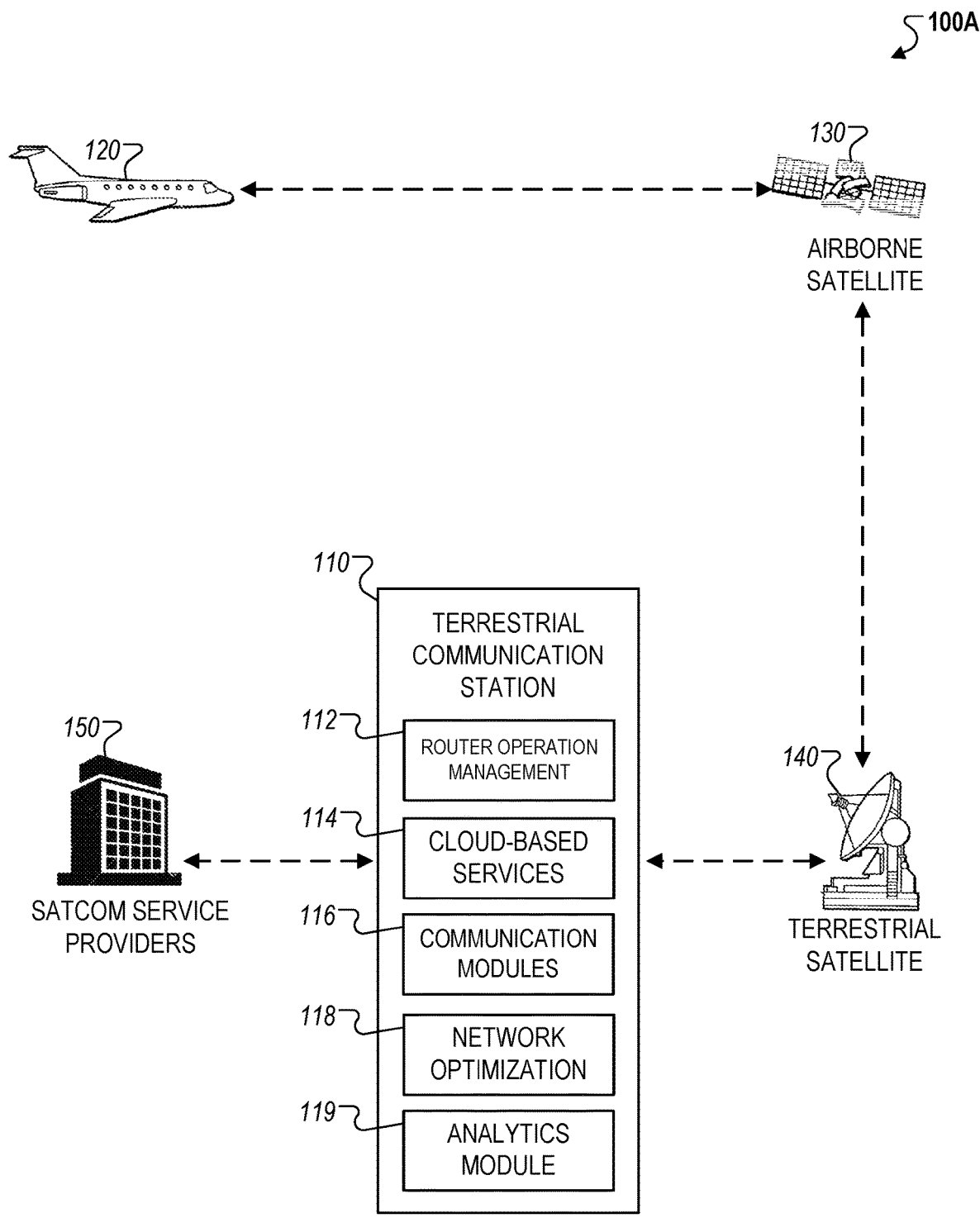
FIG. 1A is a schematic diagram of an example of a satellite network.

In general, this specification describes systems and methods relating to a satellite communication system that is a capable of utilizing converged data transmissions over a satellite network to improve various aspects of services provisioned through the satellite network. For example, the system includes multiple electronic components that operate within a common software application framework to enable the ability to perform monitored operations in real-time. The system uses the monitored data to dynamically and intelligently adjust network configurations of the satellite network configuration to dynamically and intelligently improve to the provisioning of network-based services under varying network conditions.

As described herein, "converged data transmissions" refer to data transmissions over a satellite network by electronic devices that are associated with different points of a signal transmission pathway, e.g., a pathway between a computing device on board an aircraft and ground servers associated with satellite communications service providers. The converged data communications over the satellite network can be collectively processed and/or aggregated to improve, for example, signal transmission or bandwidth allocation over the satellite network. For example, as described in detail below, converged data transmissions can be used to identify network performance bottlenecks in real-time and dynamically adjust network configurations to intelligently distribute network resources in a manner that potentially addresses the identified network performance bottlenecks.

As described throughout, "real-time" refers data or information that is collected and/or processed instantaneously with minimal delay after the occurrence of a specified event, condition, or trigger. For instance, "real-time monitoring data" or "monitoring data collected in real-time" refers to network status data and/or network performance data (e.g., a connectivity status, available bandwidth, upload/download speed, network latency, etc.) that is processed with minimal delay after a data packet is transmitted between two devices that are connected over a network access point of a satellite network. The minimal delay in collecting and processing the real-time monitoring data is based on a sampling rate of data collection, and a time delay associated with processing collected data. As an example, a monitoring device may collect 10 samples of packet data every 100 milliseconds.

In addition, the use of converged data transmissions enables computing devices associated with a satellite network to recognize and/or identify data collected by other computing devices that, in some traditional satellite communication systems, are often associated with disparate third-party service providers and are therefore unable to directly exchange data transmissions. This limitation often causes the insufficient collection and/or determination of network performance data because, for example, multiple devices of a signaling pathway of a satellite network may collect data in incompatible formats. To address this limitation, the satellite communication system described herein accumulates data collected from multiple computing devices within a signaling pathway of a satellite network to dynamically compute network performance data in real-time, intelligently monitor network performance over the satellite network in real-time, and adjust various types of network configurations to improve network performance over the satellite network.

FIG. 1A is a diagram that illustrates an example of a satellite network 100A. Briefly, the network 100A may include a terrestrial communication station 110, an aircraft 120, an airborne satellite 130, a terrestrial satellite 140, and one or more satellite communications (SATCOM) providers 150.

The terrestrial communication station 110 may include multiple software modules that enable the provisioning of communications services between the aircraft 120, the airborne satellite 130, the terrestrial satellite 140, and the one or more SATCOM providers 150. For instance, the terrestrial communication station 110 may include a router operation management module 112, a cloud-based services module 114, communications modules 116, a network optimization module 118, and an analytics module 119.

The router operation management module 112 may be a cloud-based monitoring platform that is capable of utilizing artificial intelligence (AI) to manage the processing operations associated with the network 100A. For instance, the router operation management module 112 may include capabilities such as central configuration management, remote diagnostics and maintenance, and automatic firmware upgrades. For example, the router operation management module may periodically monitor current configurations of the network 100A, automatically perform system checks and performance analyses, and in response to detecting aberrant activity, transmit notifications indicating results of the system checks.

In some implementations, the router operation management module 112 exchanges communications with a cabin modem 174 in order to monitor the operations of the cabin router 172. For example, the cabin modem 174 may monitor router services, application usage, detected number of system failures, computation resource measurements (e.g., processing, memory, etc.) and generate activity logs that report the monitored activities. In addition, the client may package the monitor data and transmit the packaged data to the terrestrial communication station 112 with a signal to take further action.

In some instances, the particular action taken by the cabin modem 174 in response to detecting aberrant activity may vary based on the severity associated with the aberrant activity. For example, if the detected aberrant activity indicates a critical issue that can potentially cause an emergency circumstance for the aircraft 120, the cabin modem 174 may immediately transmit monitored activity data to the terrestrial communication station 110 using a network tunnel through the airborne satellite 130 and the terrestrial satellite 140 for urgent data analysis. In addition, if automatic fixes are not feasible, the cabin modem 174 may additionally transmit a signal to request a call with emergency service personnel.

The cloud-based services module 114 may include various services that are designed to enable the SATCOM providers 150 to provide satellite communications services in a more efficient manner. For instance, the cloud-based services module 114 may include a Worldwide Virtual Number (DID) and Voice over IP (VoIP) Origination and Termination platforms that are designed to help the SATCOM providers 150 lower overhead in provisional services. In addition, the cloud-based services module 114 may include an automated billing platform that operates with financial transaction systems to support fractional billing patterns of the SATCOM providers 150.

The communication modules 116 may include end-to-end voice and text communication services between the aircraft 120 and the terrestrial communication station 110. For instance, the communication modules 116 may include secure network end-to-end signaling and voice packet transmissions using a mobile application operating on a computing device onboard the aircraft 120. The communication modules 116 may also include satellite voice trunking using interactive voice response (IVR) with the cabin gateway of the aircraft 120.

In some implementations, the communication modules 116 is configured to operate a cloud-based private branch exchange (PBX) telephone system that enables the assignment of a corporate office PBX extension to an aircraft. In such implementations, an end user may utilize the PBX system on aircraft to access features such as IVR and voicemail to replicate the experience of making office-to-office calls.

The network optimization module 118 may include utilities that improve the performance of applications within the network 100A. For instance, the network optimization module 118 May include an IP header compression module that reduces bandwidth usage on networks with limited capacities or prohibitively costly usage rates. In such instances, the compression module is designed to operate with components of aviation communication system over the satellite network environment. The compression module may also be capable of performing packet voice steaming over various networks.

The analytics module 119 may be a cloud-based business intelligence system that monitors activity of components of the network 100A, generates activity logs based on the performing the monitoring data, and aggregates monitoring data for reporting with management information systems (MIS). In addition, the analytics module 119 May be capable of generating forecasting reports that predict overall business growth, provide insights into operational efficiency, and other aspects of business operations such as customer service.

The aircraft 120 can be any type of vehicle that is capable of flight, such as an airplane or helicopter. In some instances, the aircraft 120 can be a network-enabled commercial aircraft that is capable of providing communications services to passengers. For example, the aircraft 120 can be configured for connectivity to a satellite network and can include a network infrastructure that uses a cabin router to direct transmissions between the computing devices on board the aircraft 120 and the airborne satellite 130.

One or more computing devices may be located on the aircraft 120 while in flight. For example, computing devices used by passengers, a cabin router that directs transmissions between the computing devices and the airborne satellite 130, and a satellite modem that monitors the transmissions in order to detect aberrant activity within the transmissions between the computing devices and the airborne satellite 130. The devices on board the aircraft are depicted and described in detail below with respect to FIG. 1B.

The airborne satellite 130 can be a satellite that delays and amplifies radio telecommunications between the aircraft 120 (e.g., from the mobile application running on an on-board computing device and a cabin router) and the terrestrial satellite 140. For instance, the airborne satellite 130 may include a transponder that creates a communication channel between a source transmitter and one or more ground receivers. In addition, the airborne satellite 130 may use electromagnetic waves to carry signals between the aircraft 120 and the terrestrial satellite 140.

The terrestrial satellite 140 may be a ground station, an earth station or any other type of terrestrial radio station designed for planetary communication with aircraft such as the aircraft 120. The terrestrial satellite 140 communicates with the airborne satellite 130 by transmitting and receiving radio waves in the super high frequency or extremely high frequency bands (e.g., microwaves) in order to establish a telecommunications link over the satellite network 100A.

The SATCOM providers 150 can be one or more satellite communication service providers that provide communications (e.g., telephony and data services) to users on board the aircraft 120 with portable or mobile terminals. For instance, the SATCOM providers 150 may utilize the software modules of the terrestrial communication station 110 to provide telephone and data services to end users (e.g., users on board the aircraft 120 during flight). As described herein, systems operated by the SATCOM providers 150 may be configured, monitored, and/or adjusted by the software modules of the terrestrial communication station 110 and based on network performance activity detected over the satellite network 100A.

Figure 1B:
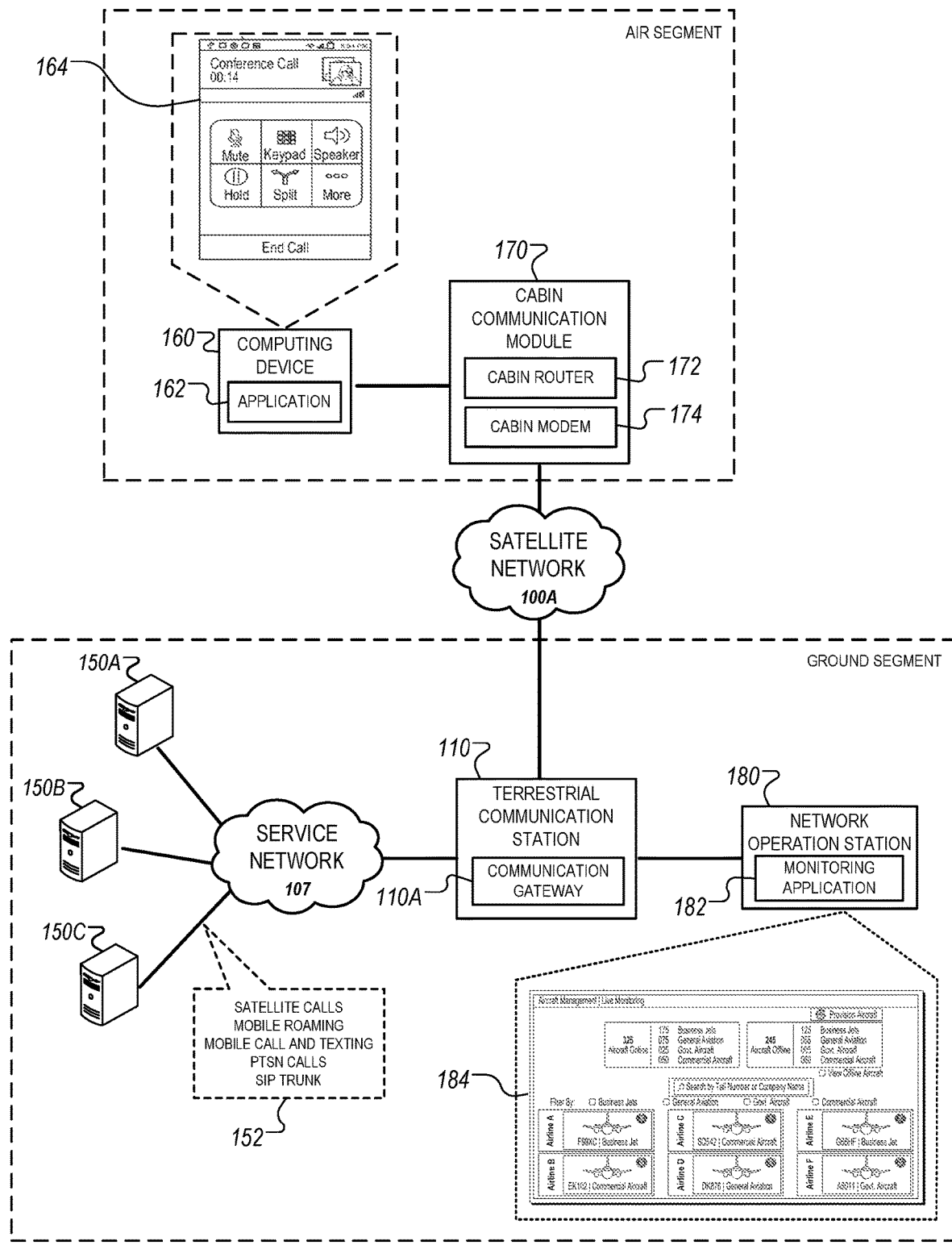
FIG. 1B is a schematic diagram of an example of a satellite communication system that is capable of exchanging converged data transmissions over a satellite network.

FIG. 1B is a schematic diagram of an example of a satellite communication system 100B that is capable of exchanging converged data transmissions over a satellite network (e.g., the network 100A). The system 100B generally includes an air segment and a ground segment.

The air segment includes devices that are, for example, on board an aircraft (e.g., the aircraft 120) in aerial flight. The air segment includes a client device 160 and a cabin communication 170. The client device 160 further includes an application 162 that provides an interface 164 for output to a user on the computing device 164. The cabin communication module 170 further includes a cabin router 172 and a cabin modem 174, which collectively enable the computing device 160 to obtain access to one or more network access points through which network services are provided to users through the application 162.

The ground segment includes devices that are, for example, located in one or more terrestrial locations. The ground segment includes the terrestrial communication station 110, the network operation station 180, and SATCOM provider systems 150A-C. The terrestrial communication station 110 further includes a communication gateway 110A, which enables communications with devices of the air segment using the satellite network 100A. The network operation station 180 further includes a monitoring application 182 that monitors and tracks network performance data, e.g., available bandwidth, online status, etc., in real-time (or substantially in real-time). The terrestrial communication station 110 exchanges data communications with the SATCOM provider systems 150A-C using a service network 107, which enables the service providers 150A-C to provision network services 152 to users on board an aircraft, e.g., a user associated with the computing device 160.

In general, electronic devices of the system 100 6 are capable of exchanging converged data transmissions over the satellite network 100A such that data collected by each individual device is processed in tandem and collectively processed and/or aggregated to dynamically and intelligently adjust a network configuration of the satellite network 100A in real-time, as described in detail below. The converged data transmissions exchanged by devices of the system 100B can be used to enable, for example, dynamic network bandwidth allocation, improved call quality, and/or reduce network timeouts over network access points of the satellite network. For example, the network operation station 180 may obtain network performance data monitored by the terrestrial communication station 110 over the communication gateway 110A as well as network access point data collected by the cabin communication module 170. In this example, the collective processing of network performance data and network access point grant data enables, for instance, dynamic reallocation of network resources over multiple network access points, which can be used to improve overall network performance experienced during a communication session on the computing device 160.

In addition, the system 100B uses various processing techniques to reduce the network bandwidth associated with the data transmissions over the satellite network 100A. For example, as depicted in detail in FIG. 10, the system 100 6 is capable of using a specialized codec to encode audio data that is transmitted over the satellite network 100A during a communication session on the computing device 160. The codec encodes the audio data in such a manner that call quality experienced on the computing device 160 is effectively preserved while reducing the bandwidth associated with exchanging data transmissions with the SATCOM service providers 150A-C over the satellite network 100A and the service network 107. The codec is described in detail below with respect to FIG. 9.

The computing device 160 can be any type of portable electronic computing device that is capable of establishing a connection to a remote network, such as wireless local area network (WLAN) generally or a network access point of a satellite network more specifically. For example, the computing device 160 can be one or more of a smart phone, a tablet computer, a laptop computing device, a smart watch, and/or any other type of suitable network-enabled portable or wearable electronic device.

The computing device 160 includes an application 162 that enables the computing device 160 generally access a network access point of the satellite network 100A. The application can be any suitable type of software that runs on the computing device 160. For example, the application 162 can be a mobile application that runs on a computing device that runs a mobile operating system (e.g., a smartphone, tablet computing device, etc.) or a desktop application that runs on a computing device that runs a desktop operating system (e.g., a laptop computing device).

Figure 4:
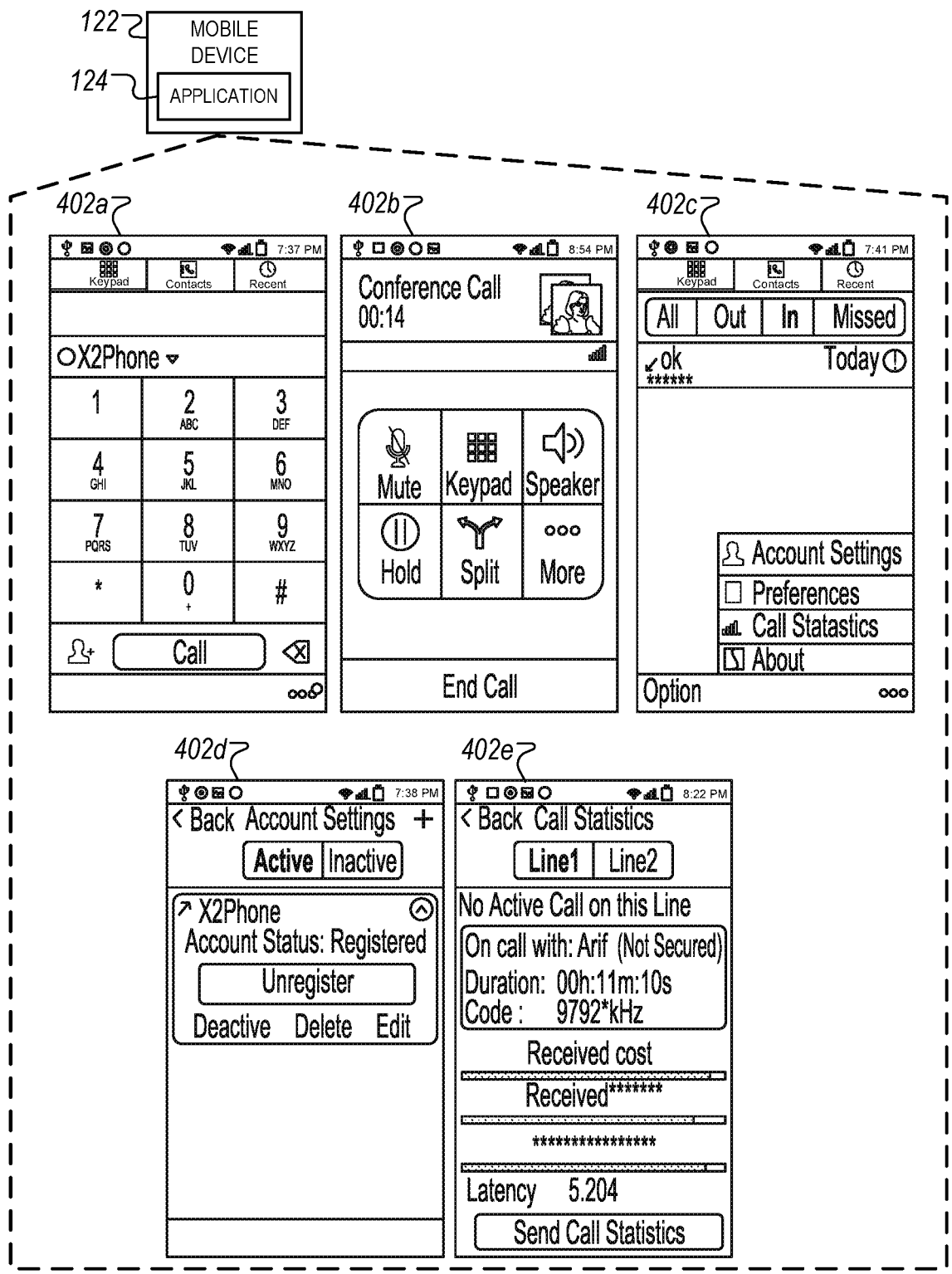
FIG. 4 is a schematic diagram that illustrates examples of user interfaces that are presented on computing devices on board an aircraft in associated with the satellite communication system illustrated in FIG. 1B.

When a user uses the computing device 160 to access in-flight network services, the cabin router 172 grants access to a network access point of the satellite network 100A to the application 162. This grant enables the computing device 160 to, for example, access the Internet or initiate a communication session, based on exchanging data transmissions with the communication gateway 110A through the cabin communication module 170. These data transmissions can occur while an aircraft (e.g., the aircraft 120) is flying, such that the application 162 enables the computing device 160 to receive access to a set of in-flight network services associated with network services 152 provisioned by SATCOM providers (e.g., the SATCOM providers 150). Examples of user interfaces provided through the application 162 to allow a user to access in-flight network services are depicted in FIG. 4.

In some implementations, the application 162 is configured to operate with an audio codec that enables enhanced bi-directional audio transmission between the computing device 160 and a terrestrial device (e.g., a computing device on the ground) while an aircraft is in flight. For example, the audio codec can be used to encode audio data in such a manner that maintains high audio fidelity using, for instance, dynamic bandwidth adjustment over the network access point of the satellite network to which the computing device 160 is connected. The use of the audio codec to improve audio quality during a communication session is described in detail below with respect to FIG. 9.

The application 162 can include one or more security features that protect the integrity of data transmitted over the satellite network 100A. For example, prior to providing access to network services on the computing device 160, the application 162 can require a user to authenticate his/her identity prior to establishing a private communication session between the computing device 160 and a ground device that exchanges communications with the computing device 160 through the satellite network 100A, e.g., through the terrestrial communications system 110, the ground satellite 140, and the airborne satellite 130. Additional security features can include requesting a user to provide a user input that includes authentication information, such as credential data, that is used to verify the identity of the user. For example, the credential data may include a username and password submission, a biometric input (e.g., a fingerprint), and/or a unique pattern submission on the computing device 160. As described more particularly with respect to FIG. 2A, the user input provided by the user may be validated prior to establishing the aircraft communication session.

The cabin communication module 170 can generally include one or more networking devices that coordinate access to network access points of the satellite network 100A. For example, the cabin communication module 170 includes the cabin router 172, which forwards data packets to the computing device 160 and performs various traffic directing functions, and the cabin modem 174, which modulates one or more carrier wave signals to encode digital information for transmission and demodulates signals to decode the transmitted information. In some implementations, the cabin router 172 and the cabin modem 174 can represent separate hardware components that are, for example, placed in different regions of an aircraft. In alternate implementations, the cabin routers 172 and the cabin modem 174 can represent different logical components of a single piece of hardware that is housed in a single location of the aircraft. The descriptions of the functionalities of the cabin communication module 170, and its components, are therefore not restricted to specific hardware and/or implementations as understood by one or ordinary skill in the art.

The cabin router 172 can be a networking device on board an aircraft (e.g., the aircraft 120) that transmits data packets between the computing device 160 and the terrestrial communication station 110 over the satellite network 110 using communications satellites such as the airborne satellite 130 and the ground satellite station 140. In addition, the cabin router 172 may perform intelligent traffic directing functions based on the network attributes and/or performance data associated with the satellite network 100A and detected by electronic components in different regions of the transmission pathway.

In some implementations, the cabin router 172 is a multi-functional voice and data communication gateway system, which is often described herein as an "airborne communication gateway." In such implementations, the cabin router 172 may provide all necessary local area network (LAN) and wide area network (WAN) interfaces to enable multiple users onboard the aircraft 120 to access voice and data services provided by the SATCOM service providers 150A-C through service network 107. In addition, the cabin router 172 can include separate service and/or network platforms for performing high-end network routing operations such as a custom applications processing and Internet Protocol Private Branch Exchange (IP PBX) functions.

As described above with respect to FIG. 1A, the terrestrial communication station 110 can include one or more software modules that perform operations associated with the satellite network 100A. For example, the software modules can perform can support and/or enable communications through the communication gateway 110A.

The network operation station 180 can include one or more computing systems that are configured to monitor network activity and network performance over the satellite network 100A through the monitoring application 182. For example, the network operation station 180 can be implemented as a software module on one or more servers that exchange data transmissions with the terrestrial communication station 110. In some implementations, the network operation station 180 can be managed by a third-party service provider that is distinct and independent from a service provider that operates and manages the terrestrial communication station 110. For example, the service provider that manages the network operation station 110 can be an organization that provides software products and/or services to SATCOM service providers that manage the SATCOM provider systems 150A-C.

The monitoring application 182 provides an interface 184 to a system administrator to track the network activity and network performance over the satellite network 100A. For example, as depicted in detail in FIGS. 8A-G, the system administrator my adjust a dynamic bandwidth allocation over a network access point of the satellite network 100A to improve network performance on the application 162 based on monitoring converged communications in real-time. Examples of network performance parameters include a total available bandwidth, a download/upload speed, voice call quality, resource allocation, among others.

The SATCOM provider servers 150A-C can represent computing systems that are managed and/or operated by SATCOM providers (e.g., the SATCOM providers 150 that are associated with the satellite network 100A as depicted in FIG. 1A). For example, each of the SATCOM provider server 150A-C can be managed by a different independent SATCOM provider such that the system 100B is capable of provisioning a set of network services 152 to multiple independent third-party SATCOM providers.

As described in detail below, the network services 152 are provisioned by the SATCOM providers and to customers (e.g., a user associated with the computing device 160) as on-flight services while the customers are on board a flying aircraft (e.g., the aircraft 120). To accomplish this, the SATCOM provider servers 150A-C exchange data communications with the terrestrial communication station 110 over the service network 107, which enables the SATCOM provider servers 150A-C with access to the satellite network 100A (and associated software capabilities and services). For example, a service provider that manages the terrestrial communication station 110 and/or the network operation station 180 may have an agreement with a SATCOM provider that enables the provisioning of the network services 152 over the satellite network 100A to customers of the SATCOM providers. Additional descriptions relating to the network services 152 are described below with respect to FIGS. 5A-D and 6.

In some implementations, the service network 107 is configured to enable the provisioning of network services by the SATCOM provider systems 150A-C over a cloud-based service application framework. For example, the SATCOM provider systems 150A-C can each host a set of network-based services (e.g., the network services 152) over a cloud-based network that is operated and/or managed by the corresponding SATCOM provider system. In this example, the service network 107 enables the terrestrial communication station 110 to exchange data communications with multiple different cloud-based networks to enable the provisioning of network-based services provisioned by different SATCOM providers over the satellite network 100A. In this regard, the service network 107 enables the system 100B to enable multiple different SATCOM providers, each with different cloud-based service networks, to provision a unique set of network services over the satellite network 100A.

In addition, the service network 107 can be used to enable SATCOM providers to provision existing network services through the satellite network 100A with substantially reconfiguring and/or adjusting their existing service systems. For example, as described above, because the service network 107 enables the terrestrial communication station 110 to exchange communications with cloud-based service networks of different SATCOM providers, the service network 107 can be configured to enable the provisioning of network services using existing service frameworks of the SATCOM providers. For example, the service network 107 can function as a communication interface that enables the terrestrial communication station 110 to exchange data communications with systems managed and/or operated by SATCOM providers (e.g., the SATCOM provider systems 150A-C).

Figure 2A:
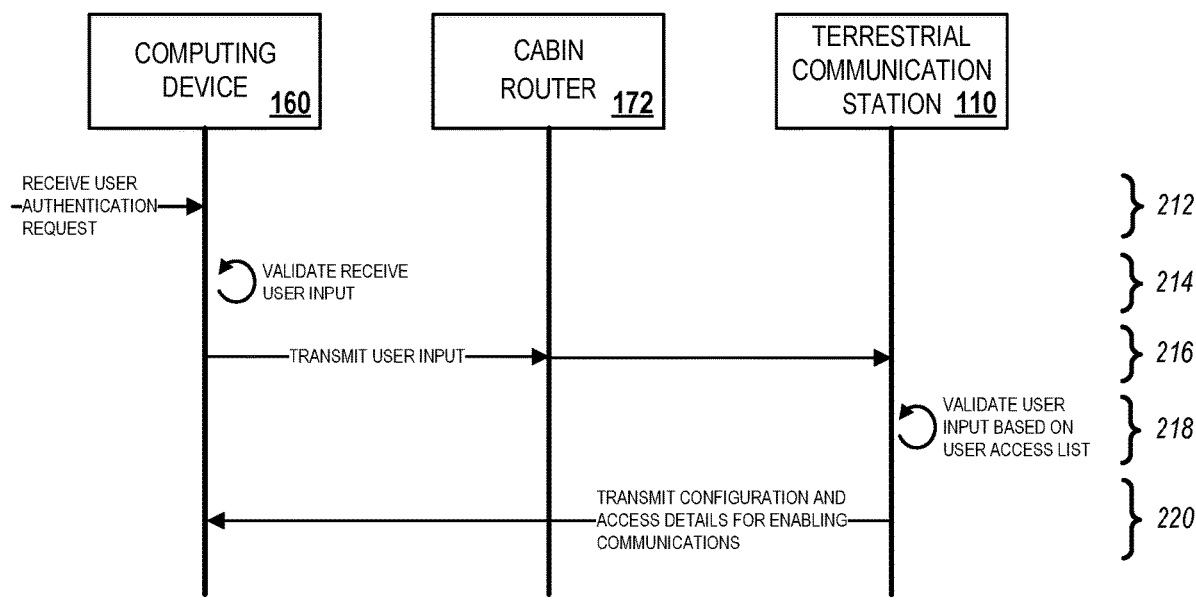
FIG. 2A is an interaction diagram that illustrates an example of provisioning a communication session for a computing device.

FIG. 2A is an interaction diagram that illustrates an example of provisioning a communication session for a computing device. Initially, the computing device 160 may receive a user input including user authentication information (212). In some instances, the user input may include a biometric fingerprint input in response to a login prompt that is presented to an end-user on the mobile application of the computing device 160. In such instances, the user input may be simple enough such that the end-user may initiate the process for initiating the aircraft communication session without providing configuration settings related to complex avionics environments.

After receiving the user input, the user input may be validated based on the user authentication information (214). For instance, the computing device 160 may validate the user input based on comparing the user authentication information included within the user input to user information associated with a set of locally stored user credential data on the computing device 160.

After validating the user input, the computing device 160 may transmit the user input to the cabin router 172 (216). The terrestrial communication station 110 may then validate the user input based on a access control list (218). For instance, the terrestrial communication station 110 may access an access control list that specifies a set of permissions associated with a user account for receiving aircraft communication services from the SATCOM service providers 150. For example, in some instances where the computing device 160 is a company-issued device, the access control list may specify permissions associated with a corporate account. In other instances, the access control list may specify a set of authorized users that are may be granted access to communications services. In such instances, the access control list may be used as a secondary validation technique used to authenticate a user to the aircraft communication services.

After validating the user input, the ground system 110 may transmit configuration and access details for enabling communications to the computing device 160 (220). For instance, examples of configuration settings may include a bandwidth allocation for the aircraft communication session based on the unallocated bandwidth over the satellite network, a particular audio quality for the aircraft communication session based on an appropriate audio codec, or a set of access details based on the information included within the access control list.

Figure 2B:
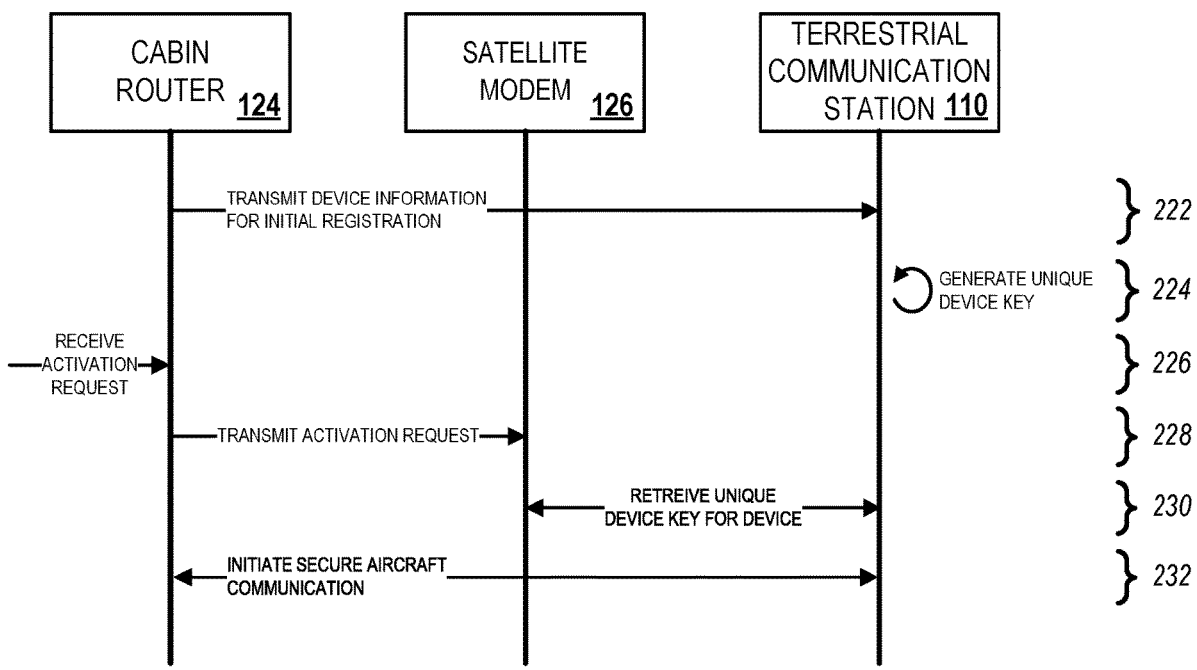
FIG. 2B is an interaction diagram that illustrates an example of securely registering and authenticating a computing device to a communication session.

FIG. 2B is an interaction diagram that illustrates an example of securely registering and authenticating a computing device to a communication session. Initially, the cabin router 172 may transmit device information associated with the cabin router 172 for initial registration to the terrestrial communication station 110 (222). For instance, the device information may be sent to the cabin router 172 during an end-user registration process that is performed prior to activating communication services within the computing device 160. The registration process may be initiated either onboard the online aircraft 120, or prior to the end-user using the computing device 160 onboard the aircraft 120. The device information associated with the computing device 160 may be used by the terrestrial communication station 110 to register the computing device 160 with the cabin modem 174, generate a user account for the user with the SATCOM providers 150 and/or perform device validation as described previously with respect to FIG. 2A. For example, in such implementations, the device information may include user authentication information, which may be used to validate the received activation request.

After receiving the device information, the terrestrial communication station 110 may generate a unique device key for the use computing device 160 (224). For instance, the terrestrial communication station 110 may provide a specific device key for enabling secure communications. The device key may be used to request access to secure communications services to only authorized computing devices 160 that are associated with the device key. For example, the key may be used to ensure that the computing devices 160 that submit activation requests to the cabin router 172 are registered with the ground communications server and have been provided with the device key.

The cabin router 172 may then receive an activation request from the computing device 160 (226). For instance, the activation request may include a request for a particular set of communications services, and/or a request to initiate a communication session as described previously with respect to FIG. 2A. The cabin router 172 may then transmit the activation request to the cabin modem 174 (228).

After receiving the activation request, the cabin modem 174 may retrieve the unique device key for the computing device 160 from the terrestrial communication station 110 (230). For instance, the unique device key may be stored within a user account on the terrestrial communication station 110 after performing the registration process as described in step 234.

Finally, the cabin modem 174 may initiate a secure aircraft communication session between the computing device 160 and the terrestrial communication station (232). For instance, if the device key included within the activation request matches the device key assigned by the terrestrial communication station 110, then the cabin modem 174 may initiate the secure aircraft communication session between the computing device 160 and the terrestrial communication station 110.

Figure 2C:
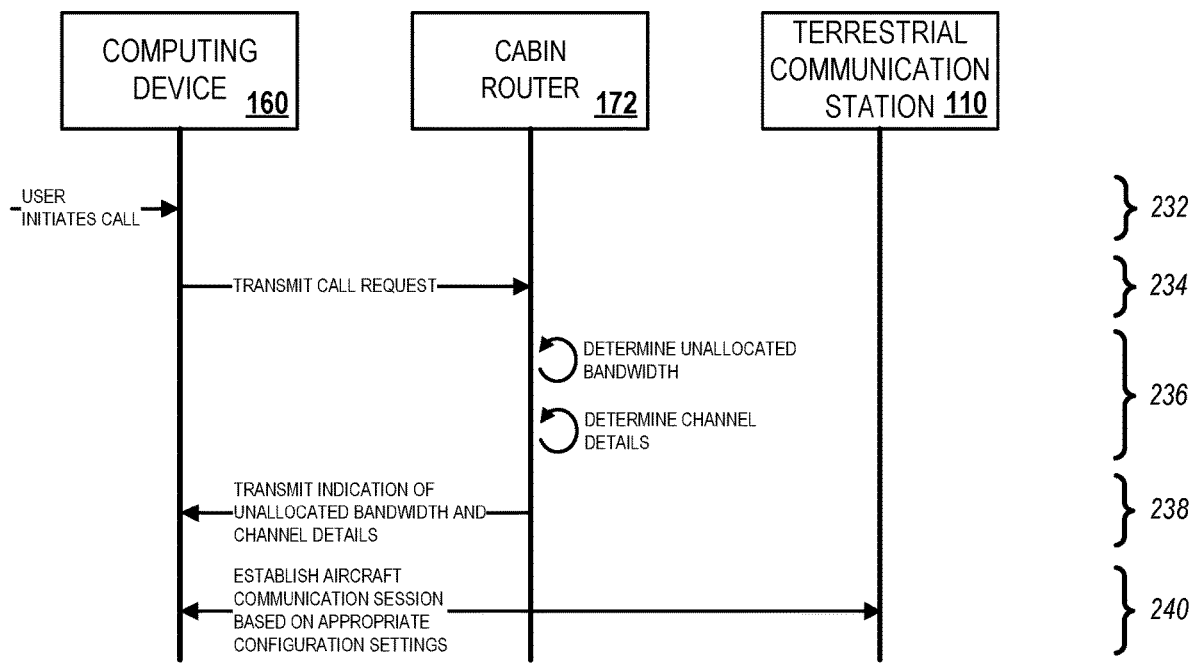
FIG. 2C is an interaction diagram that illustrates an example of generating configuration settings for a communication session based on network attributes.

FIG. 2C is an interaction diagram that illustrates an example of generating configuration settings for a communication session based on network attributes. An end-user may initially submit a request to initiate an communication session from the computing device 160 (234). For instance, as described previously, the end-user may use the mobile application on the computing device 160 to submit a request to initiate an communication session. In other instances, the end-user may utilize the cellular network connectivity of the computing device 160 to initiate the communication session. The computing device 160 may then transmit the call request to the cabin router 172 (236).

After receiving the call request, the cabin router 172 may determine unallocated bandwidth and channel details related to the satellite network (238). For instance, multiple computing devices 160 onboard the aircraft may be connected to cabin router 172 using a wireless local area network such as a Wi-Fi network. In such instances, each of the multiple computing devices 160 are assigned an internet protocol (IP) address by the cabin router 172. When one of the multiple computing devices 160 provides a call request, the cabin router 172 may initially determine the available bandwidth on the wireless local area network, based on the network activity associated with the other IP addresses assigned to each of the other multiple computing devices 160. The cabin router 172 may then determine the appropriate configuration settings for the communication session based on the available bandwidth. In addition, the cabin router 172 may determine characteristics associated with a transmission medium of the satellite network such as capacity, data rate, latency, or other types of attributes that may affect the performance of the satellite network.

The cabin router 172 may then transmit an indication of the unallocated bandwidth and channel details to the computing device 160 (240). For instance, based on the determined network bandwidth availability and the channel details related to the satellite network, the cabin router 172 may automatically determine the most suitable audio codec settings to provide the highest audio quality during the communication session. For example, in one particular implementation, the cabin router 172 may select the best possible audio codec setting using an algorithm that determines optimal settings based on using the bandwidth availability and the channel details as input parameters. Finally, the cabin router 172 may establish the aircraft communication session between the computing device 160 and the terrestrial communication station 110 based on the appropriate configuration settings as determined in the previous step (242).

Figure 3:
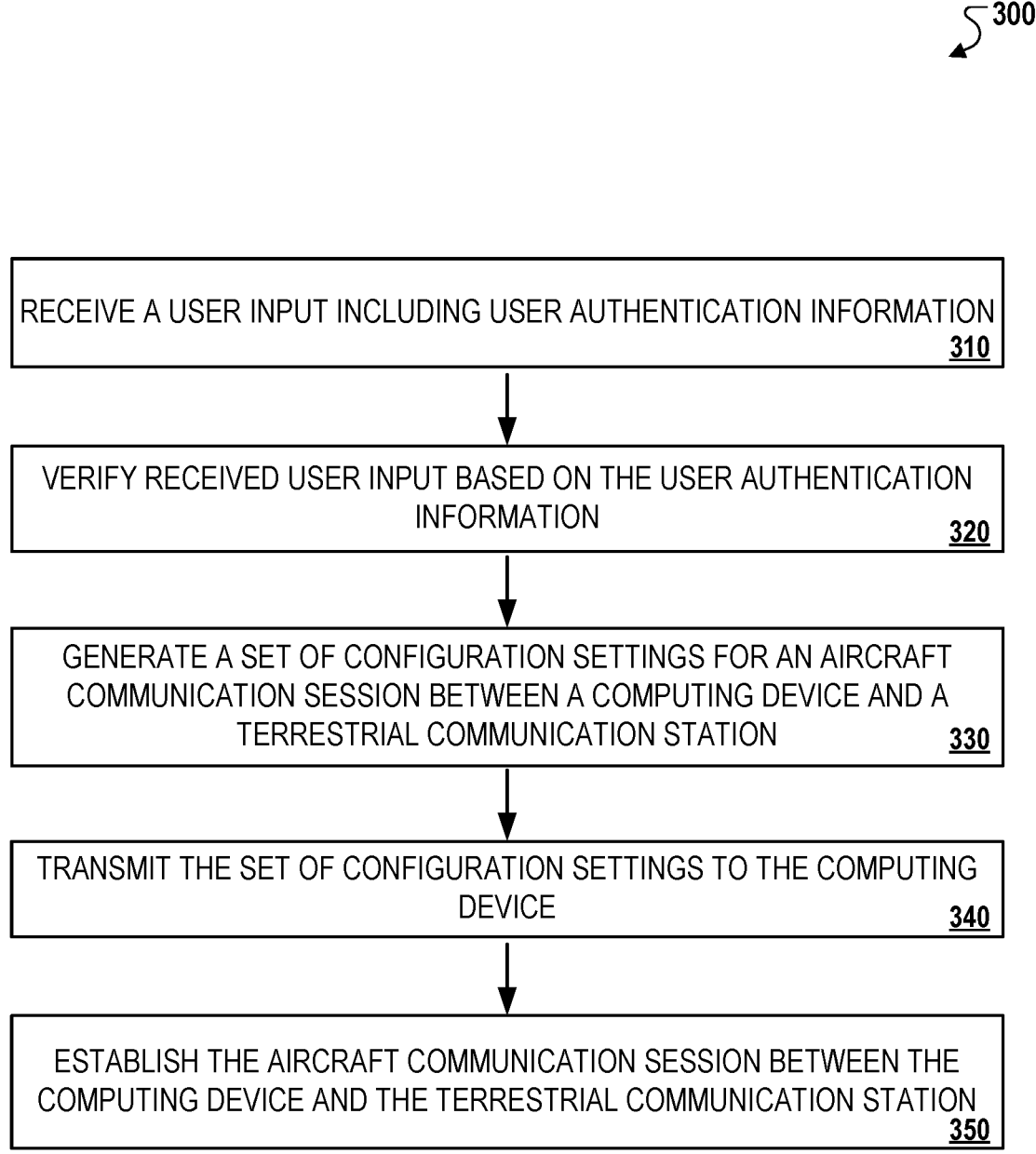
FIG. 3 is a block diagram that illustrates an example of a process for transmitting user information for display on an onboard vehicle system.

FIG. 3 is a block diagram that illustrates an example of a process 300 for transmitting user information for display on an onboard vehicle system. Briefly, the process 300 may include receiving a user input including user authentication information (310), validating the received user input based on the user authentication information (320), generating a set of configuration settings for an aircraft communication session (330), transmitting the set of configuration settings to the computing device (340), and establishing the aircraft communication session (350).

In more detail, the process 300 may include receiving a user input including user authentication information (310). For instance, as described previously, an end-user may provide a user input on the computing device 120 that may include user authentication information such as a username and password submission, a biometric fingerprint input, or some unique pattern submission. In some instances, the user input may be provided on a user interface of the mobile application as described with respect to FIG. 1.

The process 300 may include validating the received user input based on the user authentication information (320). For instance, the user input may be validated at two stages—initially within the mobile application of the computing device 160, and subsequently by the terrestrial communication station 110 using an access control list. The initial validation may include utilizing one or more security configurations of the mobile application to determine if the user input includes authentication information that matches credential data associated with the end-user. In the subsequent validation stage, the terrestrial communication station 100 may retrieve an access list that specifies a set of end-users that are subscribed to communications services provided by the SATCOM providers 150. The access list may additionally include a set of access privileges associated with a user account of the end-user.

The process 300 may include generating a set of configuration settings for an aircraft communication session (330). For instance, as described previously, examples of configuration settings may include a bandwidth allocation for the aircraft communication session based on the unallocated bandwidth over the satellite network, a particular audio quality for the aircraft communication session based on an appropriate audio codec, or a set of access details based on the information included within the access control list.

The process 300 may include transmitting the set of configuration settings to the computing device (340). For instance, the cabin router 172 may receive the set of configurations settings from the terrestrial communication station 110, and in response, transmit the set of configurations to the computing device 160. The transmission may additionally include one or more instructions to initiate the aircraft communication session through the mobile application on the computing device 160.

The process 300 may include establishing the aircraft communication session (350). For instance, the cabin router 172 may forward transmissions between the computing device 160 and the terrestrial communication station 110 using the airborne satellite 130. In some instances, as described previously with respect to FIG. 1, after initially establishing the aircraft communication session, the cabin router 172 may additionally monitor incoming and outgoing voice and data transmissions over the satellite network. In such instances, the cabin router 172 may dynamically adjust the configuration and operation of the communication session based on the network attributes of the satellite network throughout the aircraft communication session.

FIG. 4 is a schematic diagram that illustrates examples of user interfaces 402a-e that are presented on computing devices on board an aircraft in associated with the satellite communication system illustrated in FIG. 1B. The user interfaces 402a-e can be provided through the application 162 that runs on the mobile device 160. Although the examples depicted in FIG. 4 relate a voice call, in other instances, a user can the application 162 to access other types of in-flight network services (e.g., mobile data roaming, access to the Internet, etc.).

During a typical example operation, the mobile device 160 initially establishes a connection to a network access point through the cabin communication module 172. Once connected to the network access point, the application 162 enables a user to initiate a conference call over the satellite network 100A based on exchanging data transmissions with the ground component of the system 100A (e.g., the terrestrial communication station 110). The user can then use the interface 402a to input a telephone number of another entity that participates in the conference call. As shown in FIG. 4, the interface 402a includes a keypad that enables the user to input a telephone number to place a call. Once the mobile device 160 has successfully established a communication session with the other entity, the user can use the interface 402b to perform various operations. For example, the user can mute the microphone of the mobile device 160, provide input corresponding to additional dial-in numbers, adjust the audio output from the mobile device 160, place the conference call on hold, add/remove other parties to the conference, among others.

The user can additionally use the interfaces 402c-e to perform other types of actions while not actively participating in a conference call. For example, referring initially to interface 402c, the user can view a call history, any missed calls, adjust account settings, configure or adjust call preferences, view call statistics, or obtain other types of information associated with the application 162. Referring now to interface 402d, the user van view account settings of an account used to receive in-flight network services. For example, as depicted in FIG. 4, the user can determine if his/her account is presently active, and a registration status of the account. Referring now to interface 402e, the user can access a set of call statistics of prior conference calls. For example, the user can access a call duration for a prior conference call, a cost to the user associated with the conference call, and a determined network latency for the conference call. As described throughout, the call statistics are determined in real-time based on monitoring converged communications between multiple devices of a satellite communication system (e.g., the system 100B).

Figure 5A:
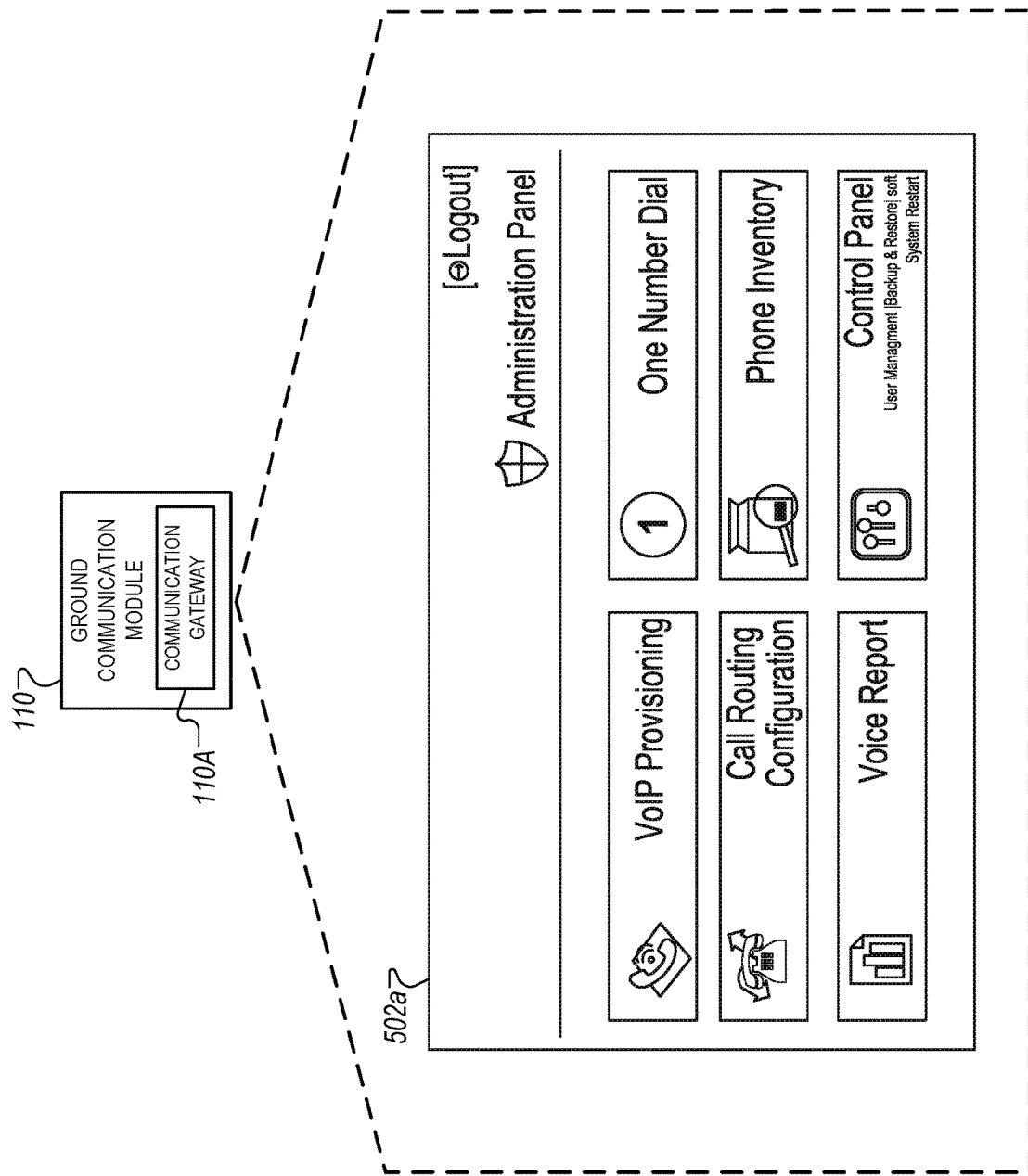
FIGS. 5A-D are schematic diagrams that illustrate examples of user interfaces for configuring and/or adjusting network services provided to computing devices on board an aircraft by the satellite communication system illustrated in FIG. 1B.

FIGS. 5A-D are schematic diagrams that illustrate examples of user interfaces for configuring and/or adjusting network services provided to computing devices on board an aircraft by the satellite communication system illustrated in FIG. 1B. Referring initially to FIG. 5A, an example interface 502a for an administration portal is depicted. As described above with respect to FIG. 1B, the administration portal can be used by a system administrator of a service provider that enables SATCOM providers to provision network services 152 to users such as a user of the computing device 160. The system administrator can use the interface 102 to, for example, configure settings for VoIP provisioning, call routing, generate reports for calls placed, view an inventory of telephone numbers that have previously made calls over the satellite network 100A, and/or perform other administrative tasks as depicted in FIG. 5A.

Figure 5B:
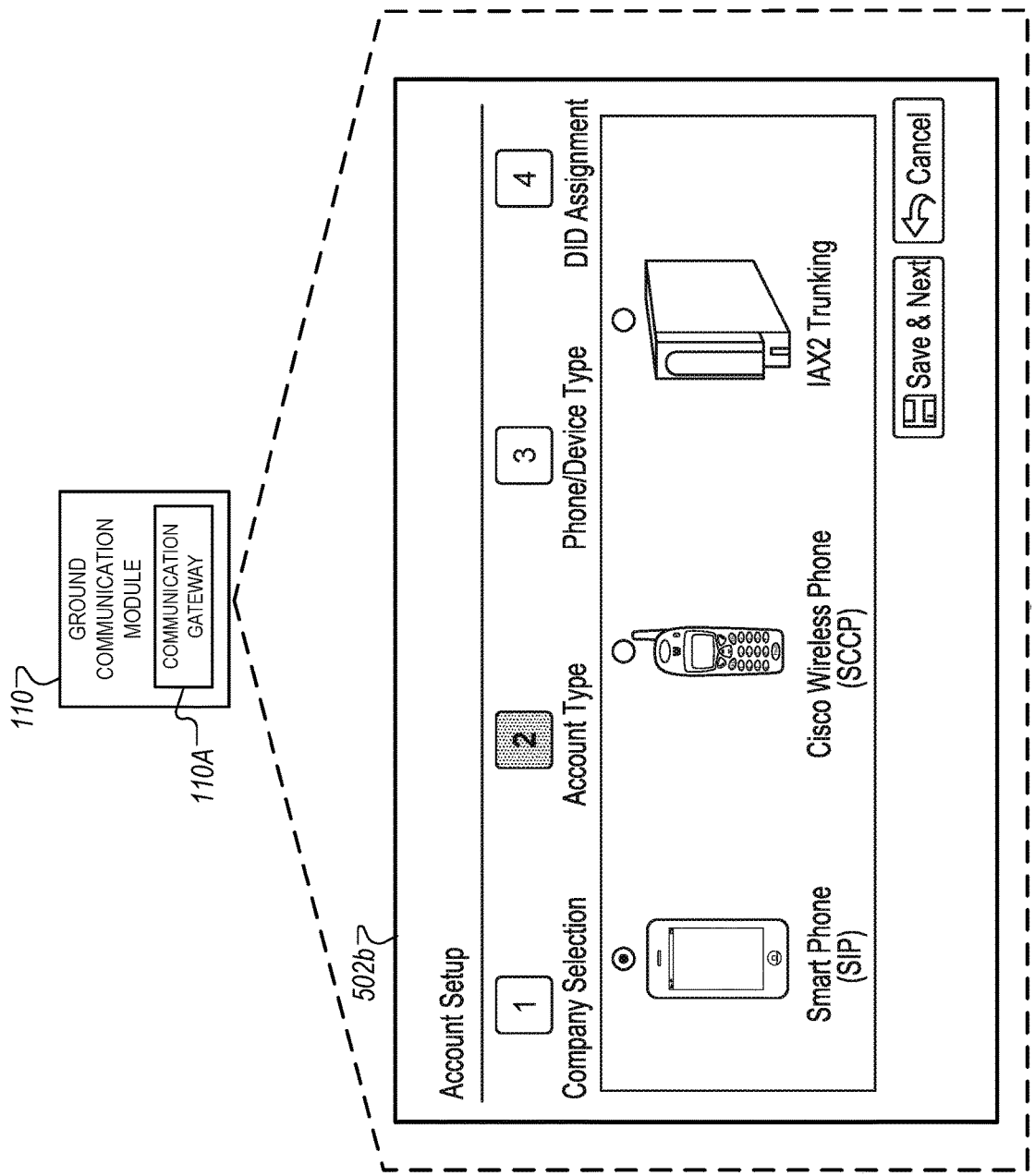

Referring now to FIG. 5B, an example interface 502b for creating a user account for a user that accesses with network services through the satellite network 100A depicted. The system administrator can use the interface 502b to specify or adjust network and/or device information that is used by, for example, the cabin communication module 170 to provide access to network access points of the satellite network 100A. As examples, the system administrator can specify customized network configurations that correspond to a device type and/or communication capabilities of the computing device 160 (e.g., compatible communication protocols, voice/data capabilities, etc.).

The system administrator can also use the interface 502b to specify other types of account information. For example, the system administrator can select SATCOM service providers that provision network services that are compatible with the computing device 160. In other examples, the system administrator can specify an account type for the user based on types of services that the user has selected to receive from the SATCOM service providers.

Figure 5C:
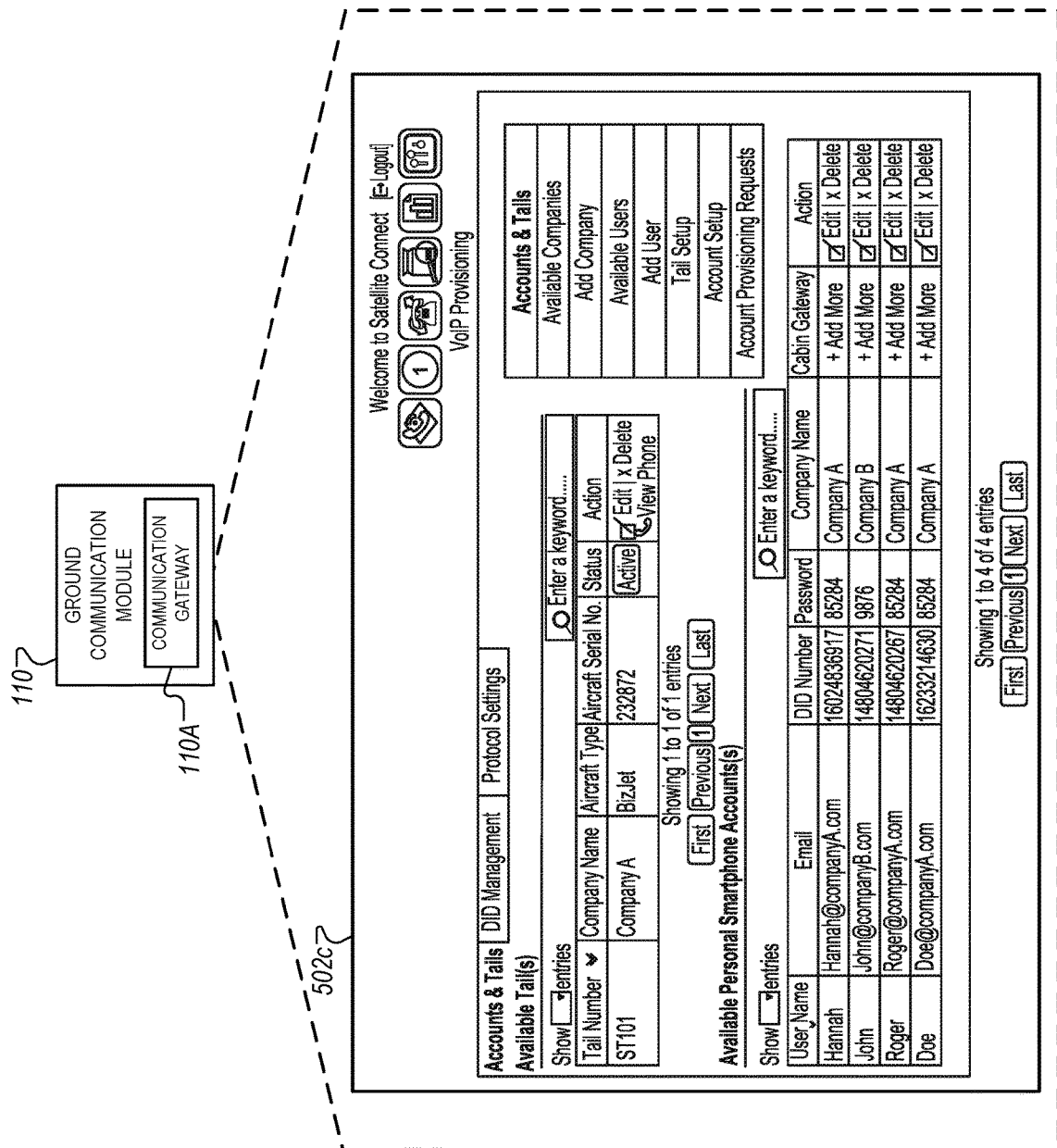

Referring now to FIG. 5C, an example interface 502c for managing customer accounts of users that receive VoIP services through the satellite network 100A is depicted. A system administrator can use the interface 502c to adjust account associations relating to the provisioning of VoIP services. For example, the system administrator can add or remove accounts of SATCOM providers that provision VoIP services. The system administrator can also add or remove user accounts of users that receive the network services provisioned by the SATCOM providers. In addition, the system administrator can adjust account assignments (e.g., user accounts that are assigned to SATCOM providers accounts, and vice versa). In this regard, the system administrator can customize SATCOM provider and user account associations to improve network performance over the satellite network 100A.

The system administrator can use the interface 502c to configure one or more network access points provided over the satellite network 100A to users on board an aircraft, which are referenced in FIG. 5C as a "tail number." For example, the tail number can be used as a unique identifier to identify an aircraft on which users are provided access (e.g., different aircraft having different tail numbers). As shown in the figure, the system administrator can create entries for each tail that specify a tail number, a SATCOM provider that provisions network services over the tail number, and aircraft information (e.g., aircraft type and aircraft serial number). A tail entry can specify whether a current status for the tail (e.g., "INACTIVE," or "ACTIVE"). In this regard, the interface 502c is used to manage various types of configurations relating to VoIP provisioning. The system administrator can also use the interface 502c to manage direct inward dial (DID) services provisioned by the SATCOM providers 150 over the satellite network 100A. For example, the system administrator can assign DID numbers to user accounts, manage passwords associated with DID numbers, among other types of management functions.

Figure 5D:
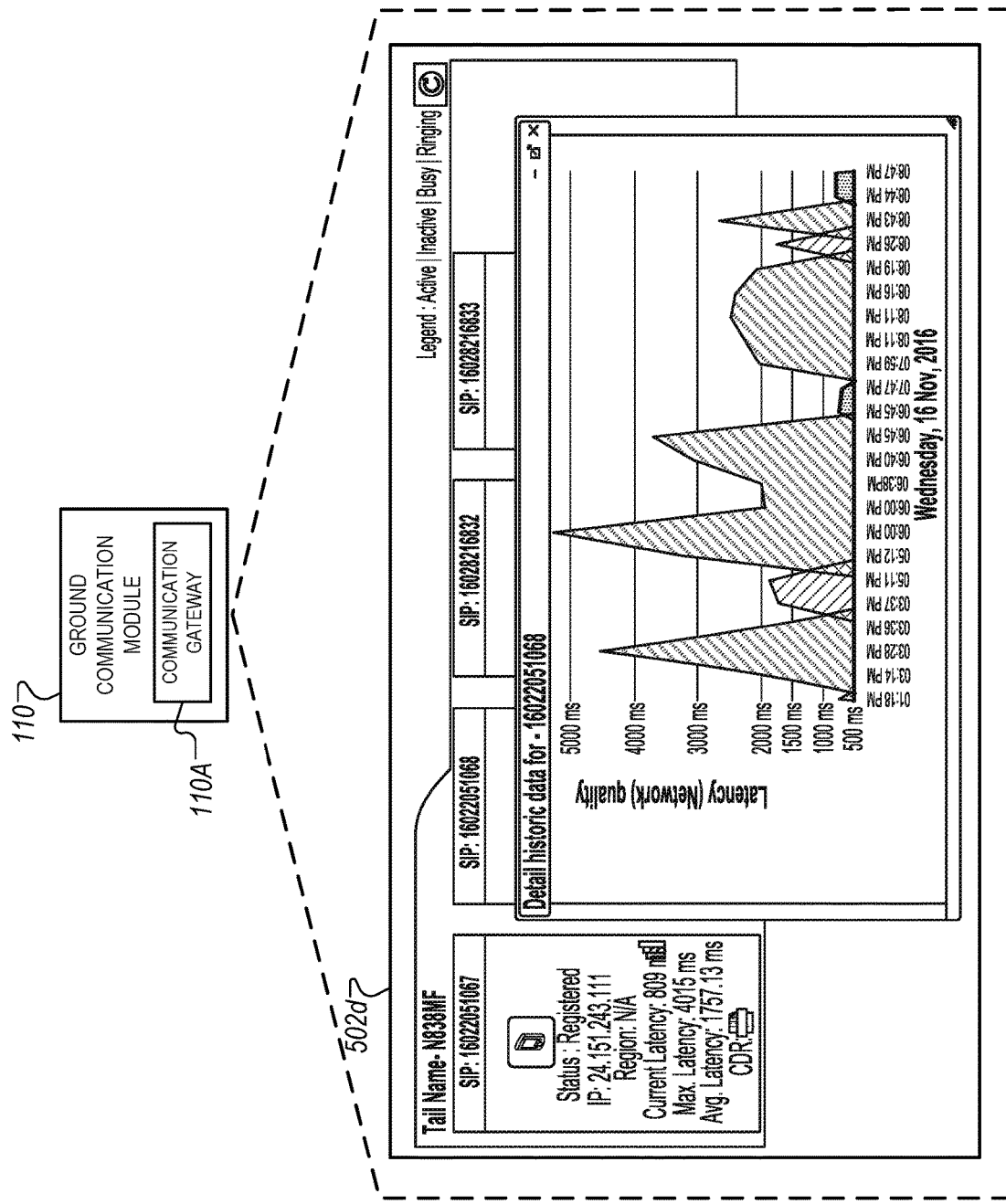

Referring now to FIG. 5D, an example interface 502d for monitoring connection events associated with a customer account through a satellite network is depicted. A system administrator can use the interface 502d to track historical network performance for network services received by a particular user account on a network access point. In the example depicted, the interface 502a presents historical network performance data, represented as latency over the network 100A, for a particular user account over a particular network access point (e.g., tail number "13212051068"). The system administrator can use the interface 502d to also access detailed historical data for other network access points of the satellite network 100A (e.g., tail numbers "13212051067," "13218216832," and "13218216833").

Figure 6:
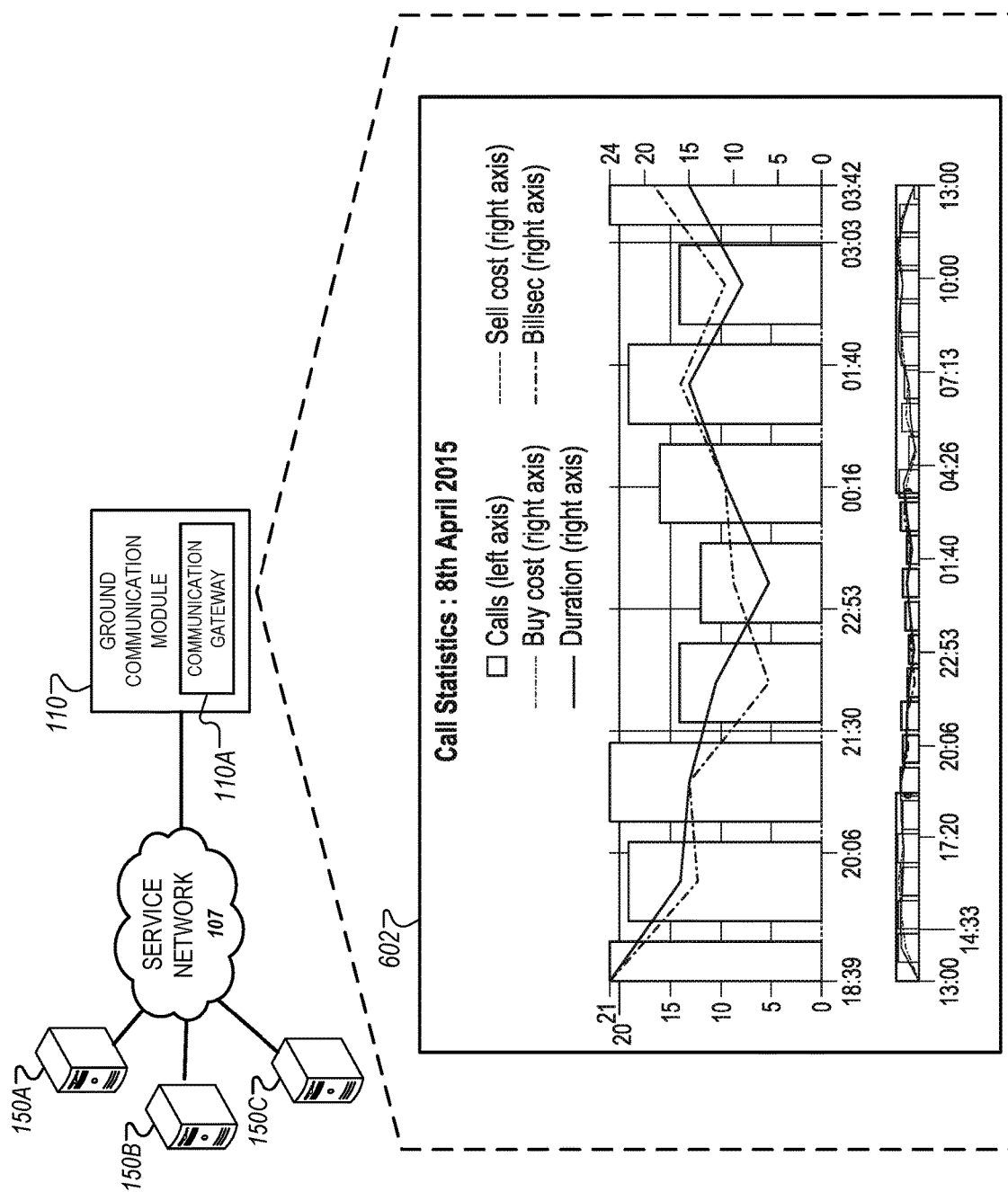
FIG. 6 is a schematic diagram that illustrates an example of a user interface presented to service providers that receive telecommunications services provisioned by the satellite communication system illustrated in FIG. 1B.

FIG. 6 is a schematic diagram that illustrates an example of a user interface 602 presented to SATCOM providers 150A-C that provision services using the system 100B illustrated in FIG. 1B. In the example depicted, the interface 602 allows SATCOM providers to view network performance statistics that are monitored by the system 100A over a period for time (e.g. a 24-hour time period). The interface 602 generally enables SATCOM providers to, for example, use data visualizations to evaluate network performance in relation to usage by users. For example, the visualizations can be used to identify correlations between voice call duration and voice call quality. In this example, the data visualizations presented on the interface 602 can be used to determine, for instance, that longer call quality often causes reduced call quality due to reduced overall bandwidth over a network access point.

Figure 7:
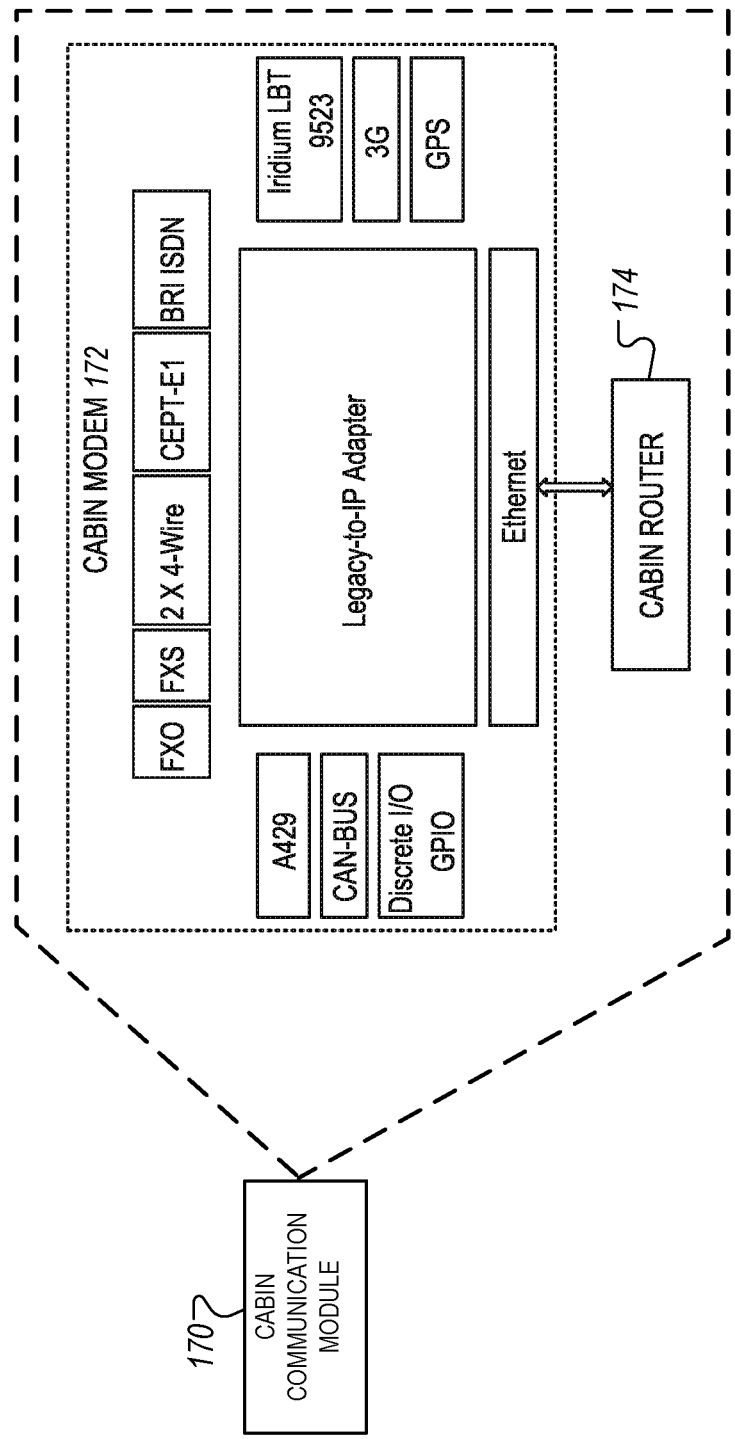
FIG. 7 is a schematic diagram that illustrates examples of components of a cabin communication module of the satellite communication system illustrated in FIG. 1B.

FIG. 7 is a schematic diagram that illustrates examples of components of the cabin communication module 170 of the system 100B illustrated in FIG. 1B. In the figure, the components of the cabin modem 172 are depicted in detail. As described above, the cabin modem 172 can be used in an aircraft to provide on-board computing devices with connectivity to the satellite network 100A.

In the example depicted in FIG. 7, the cabin modem 172 can be used as a gateway communication device that is capable of establishing communications between legacy airborne communication interfaces and IP communication interfaces without requiring significant reconfiguration. Examples of legacy analog airborne communication interfaces known to those of ordinary skill in the art include Integrated Services Digital Network Basic Rate Interface (ISDN BRI), European Conference of Postal and Telecommunications Administrations (CEPT) E1, Iridium 9523 LBT, 4-wire standards, and Foreign Exchange Subscriber (FXS) and Foreign Exchange Office (FSO), among others. Although these communication interfaces are provided as examples, the cabin modem 172 is contemplated to be configurable with other types of legacy analog communication interfaces.

To accomplish the capabilities described above, the cabin modem 172 includes an interface adapter (e.g., a legacy-to-IP adapter) that enables the cabin router 172, operating on a IP interface, to exchange communications with aviation devices that operating on legacy analog communication interfaces such as those described above. For example, the cabin modem 172 includes a printed circuit board (PCB) with an array of low-level drivers and built-in hardware adaptors that collectively convert physical analog communication signals to IP communication signals.

Figure 8A:
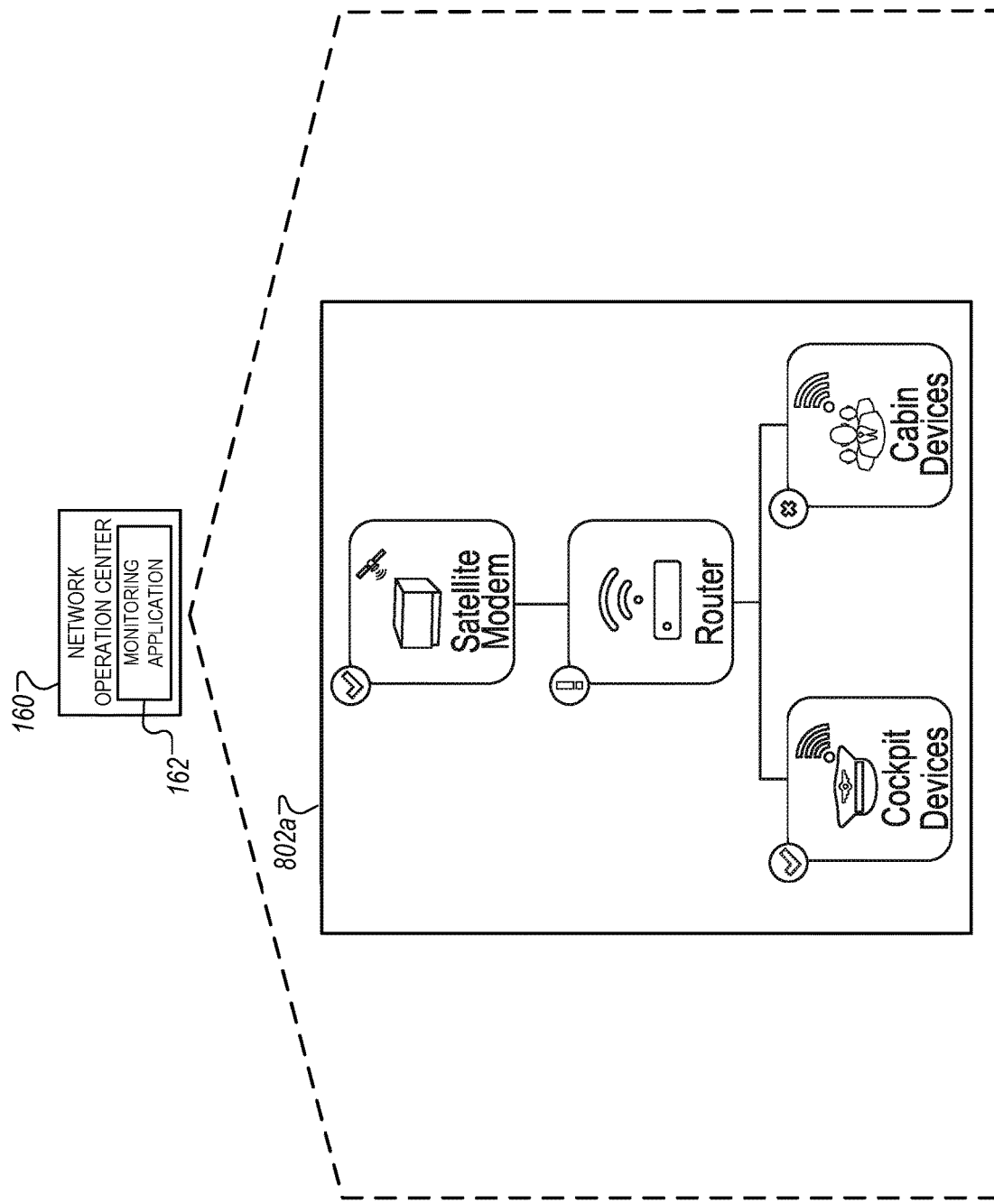
FIGS. 8A-G are schematic diagrams that illustrate examples of user interfaces presented on a network operation center of the satellite communication system illustrated in FIG. 1B.

FIGS. 8A-G are schematic diagrams that illustrate examples of user interfaces 802a-g presented on the network operation center 180 of the system 100B illustrated in FIG. 1B. Referring initially to FIG. 8A, an example of a user interface 802a for monitoring connectivity status of computing devices on board the aircraft 120 is depicted. The system administrator can use the interface 802a to determine if one or more devices on board the aircraft 120 are presently having connectivity issues. In addition, the interface 802a presents a hierarchal network structure identify problematic components to assist in diagnosing the connectivity issues.

In the example depicted in FIG. 8A, the interface 802a indicates that the cabin router 174 may a device of interest to investigate in diagnosing connectivity issues experienced by cabin devices. In this example, the connectivity issue may relate to the present network configuration of a network access point that the cabin router 174 grants to cabin devices. A system administrator can make this diagnosis based on, for example, determining that the cockpit devices are presently online over a particular network access point, while the cabin devices that are associated with a network access point are presently offline.

Figure 8B:
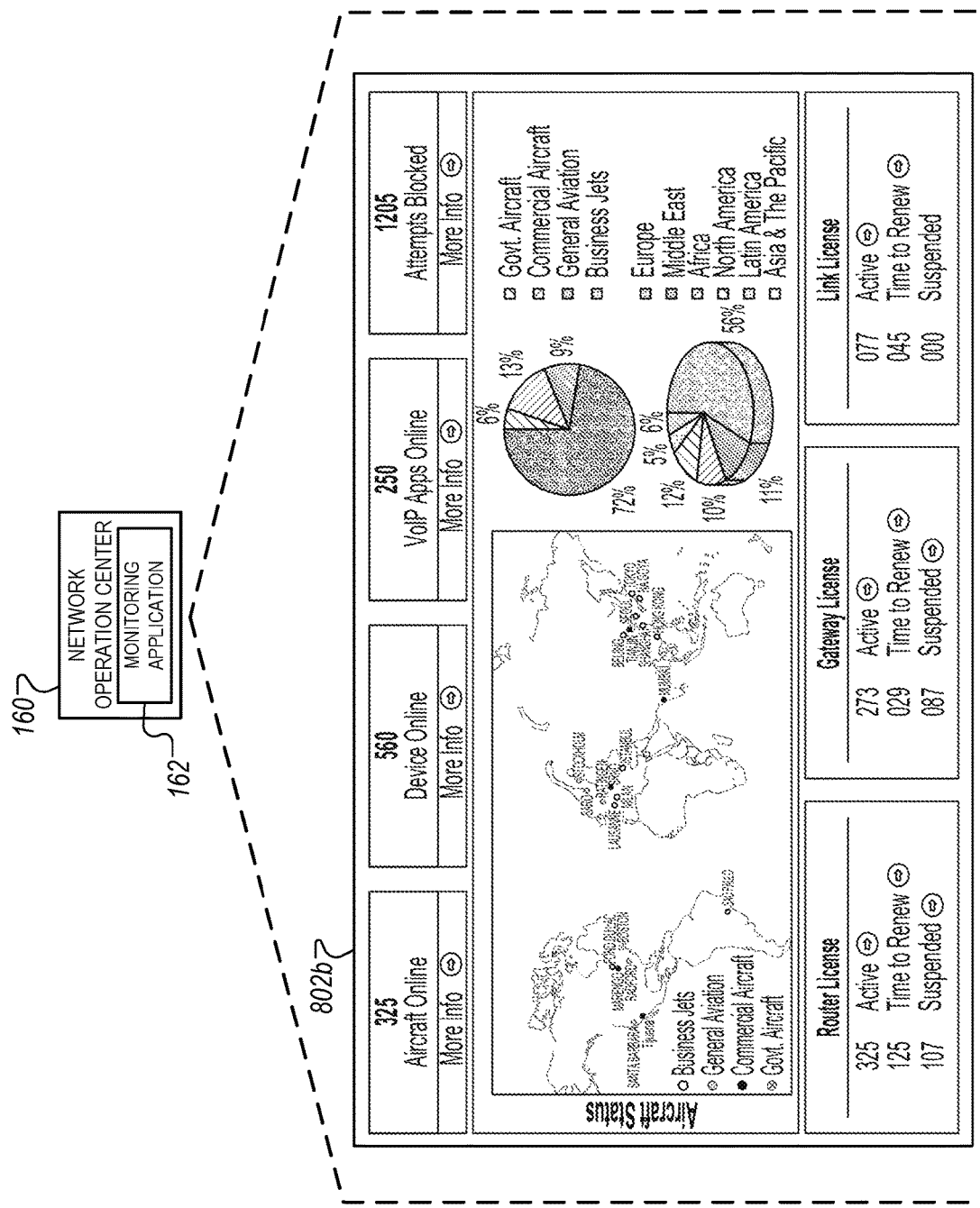

Referring now to FIG. 8B, an example interface 802b for viewing connectivity status information aircraft is depicted. A system administrator may use the interface 802b to view a dashboard that represents high-level network connectivity data for the satellite network 100A. The data displayed on the interface 802b can be collected and/or processed in real-time for display on the dashboard. As described above, this is accomplished by using converged data transmissions, which enables a more accurate accumulation of network statistics.

As shown in the figure, the dashboard presented on the interface 802b provides a set of summary statistics such as the total number of aircraft online, the total number of devices online, the total number of VoIP applications online, and a total number of connection attempts blocks. The dashboard also includes a map that includes detected global locations of connected aircraft and various visualizations that represent collected data in relation to various classifications (e.g., total assigned network bandwidth by aircraft type, totally assigned network bandwidth by detected global location).

The dashboard presented on the interface 802b also includes a license status for multiple devices based on subscription in-flight services purchased by users. For example, different licenses can be granted for users that subscribe to access for a specified time period (e.g., five minutes, thirty minutes, one hour), users that subscribe to access for the flight duration, and users that have access as a service option associated with a frequent flyer account. As shown in FIG. 8B, the dashboard can display, for each of the cabin router 174, the gateway 110A, and link, a total number of active licenses, a total number of active licenses that will expire within a specified time period, and a total number of expired licenses.

Figure 8C:
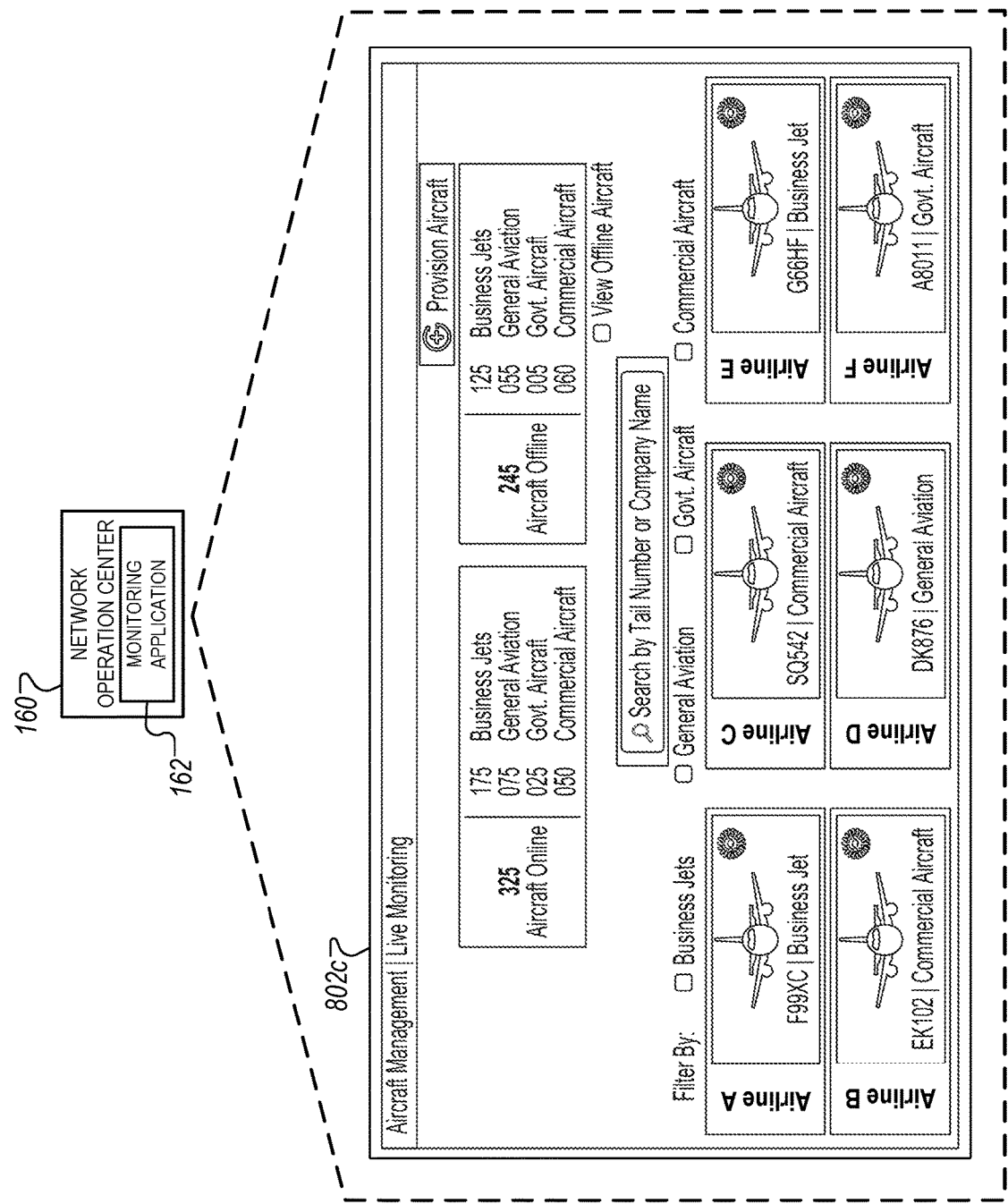

Referring now to FIG. 8C, an example user interface 802c displaying a dashboard for monitoring network connectivity of aircraft devices in real-time is depicted. A system administrator can use the dashboard presented on the interface 802c to monitor the activity of cabin communication modules of multiple aircraft that are presently in the air. The data displayed on the interface 802c can be collected and/or processed in real-time for display on the dashboard in a similar manner as described above. In this regard, the system administrator can view and monitor network data while the aircraft are flying from an origination point to a destination point.

As shown on the figure, the dashboard presented on the interface 802c provides a set of summary statistics such as the total number of aircraft online, the total number of aircraft offline, and to the various types of aircraft in each group. The dashboard also provides user interface elements that include data objects for individual aircraft that is currently detected to be online. The data objects are generated based on associations between SATCOM provider accounts and user accounts with respect to specified trails (e.g., network access points on the satellite network 100A) as described above with respect to FIG. 5C.

The system administrator can also use the dashboard presented on the interface 802c to filter and/or search the user interface elements based on a set of search criteria (e.g., aircraft identifier, aircraft type, SATCOM provider, user account, etc.). For example, the system administrator can filter the dashboard for a particular aircraft to view monitoring data collected specifically for the particular aircraft. In some instances, the system administrator can also view detailed view of the dashboard that provides other examples of network performance data (e.g., device-level statistics collected for computing devices on board the particular aircraft, or trip-level statistics collected for different trips completed by the particular aircraft).

Figure 8D:
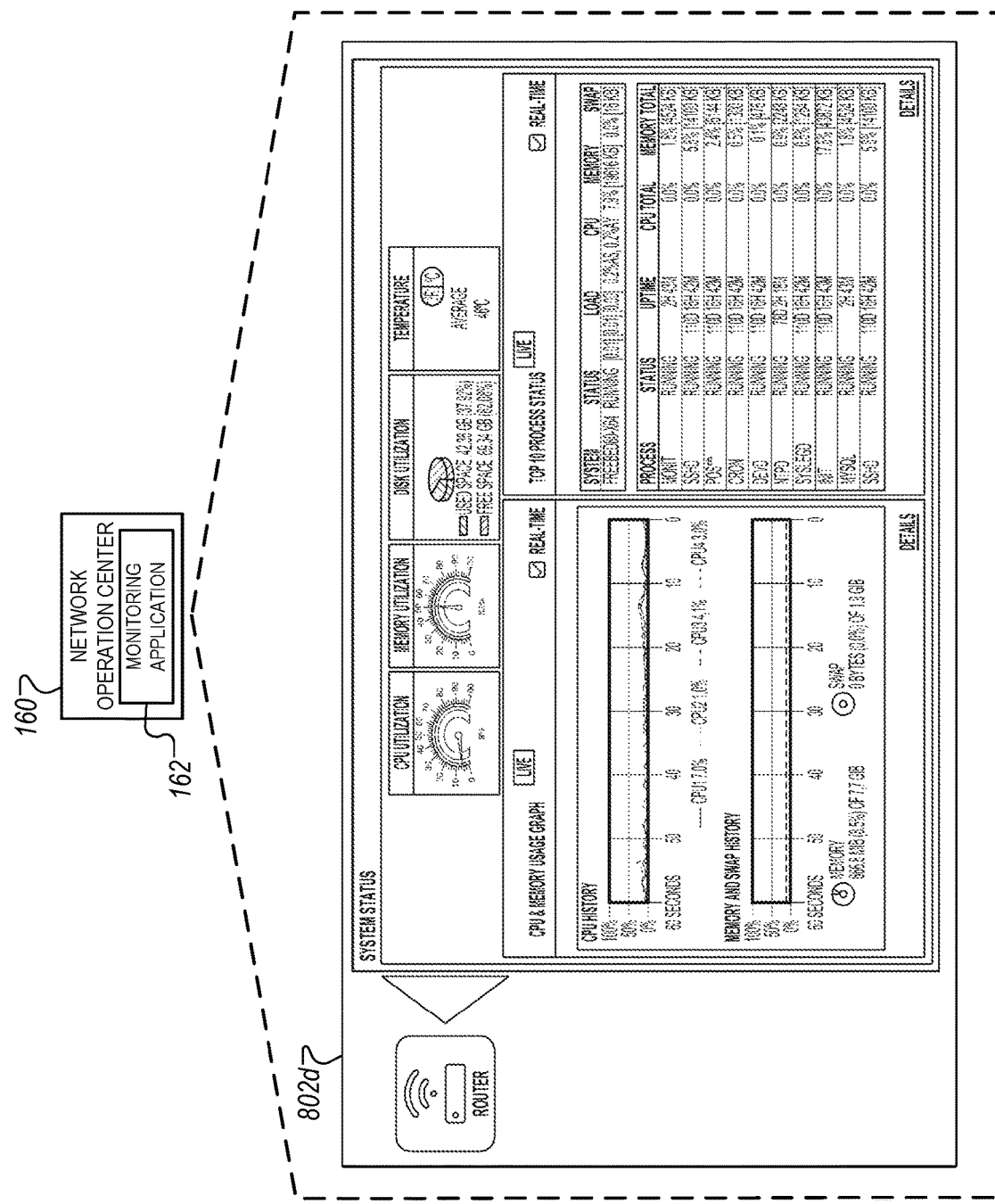

Referring now to FIG. 8D, an example interface 802d for monitoring operations of the cabin router 172 is depicted. A system administrator can use the interface 802d to monitor activity of the cabin router 172 in real-time. For example, as depicted in FIG. 8D, the system administrator can monitor hardware performance (e.g., CPU utilization, memory utilization, hard disk utilization, temperature, etc.). The system administrator can also access visualizations that track performance in real-time in relation to historical performance (e.g., CPU usage history, memory usage history and swap history over the last sixty seconds). The system administrator can also access performance summary statistics for applications running on the cabin router 172 (e.g., application status, application load, CPU usage, memory usage, swap usage, etc.).

Figure 8E:
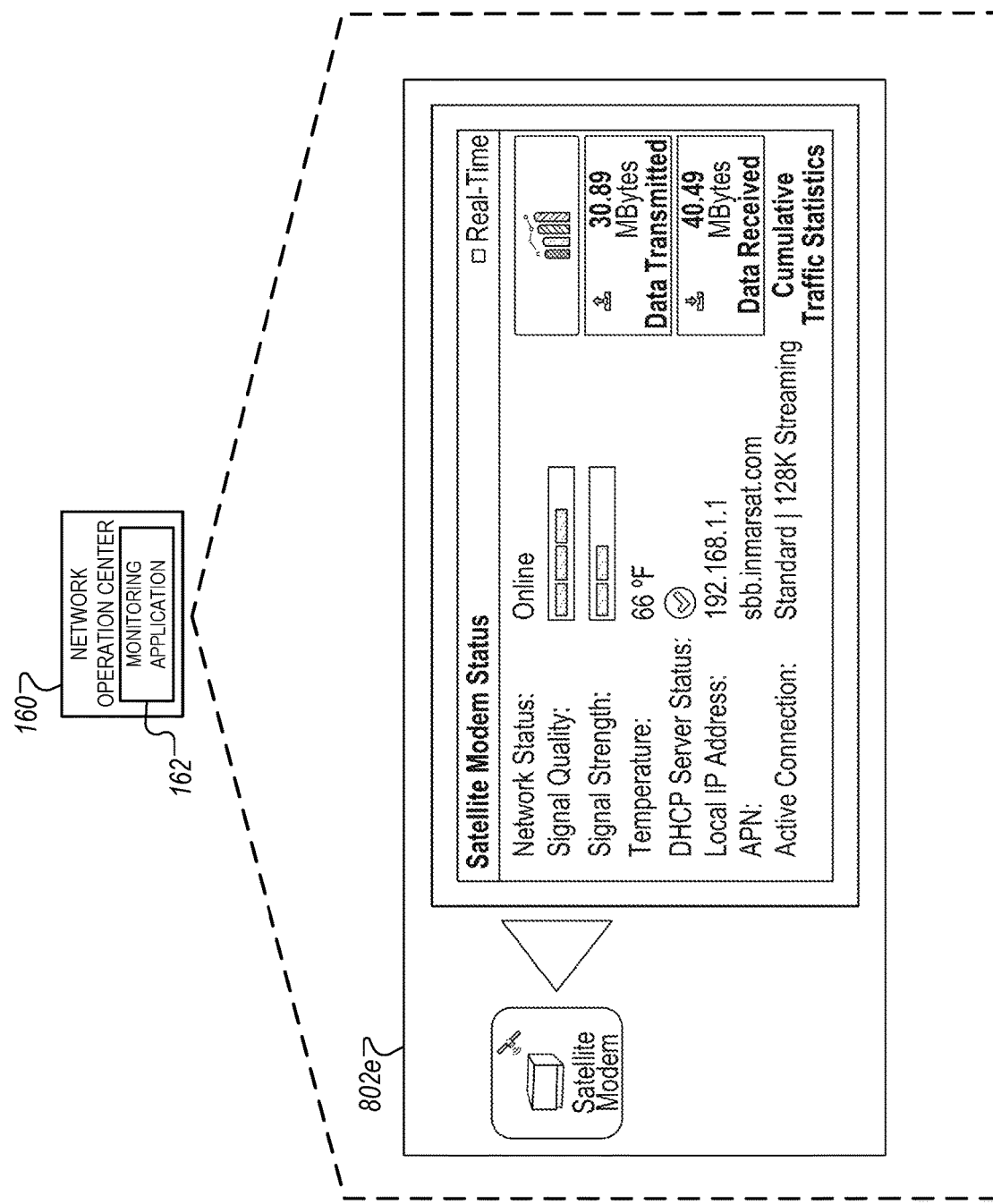

Referring now to FIG. 8E, an example interface 802e for monitoring operations of the cabin modem 174 is depicted. A system administrator can use the interface 802e to monitor activity of the cabin modem 174 in real-time. For example, as depicted in FIG. 8E, the system administrator can monitor a connectivity status (e.g., "ONLINE" or "OFFLINE"), a signal quality of the connection over the satellite network 100A (e.g., reliability of data packet transmission), a signal strength of the connection (e.g., a magnitude associated with transmitting and receiving signals used for the connection). The system administrator can also view network configuration data (e.g., DHCP server status, local IP address, access point name (APN), type of connection, etc.). As shown in FIG. 8E, the interface 802e can also present network performance data collected in real-time such as data transmitted, data received, and other types of summary network statistics described below with respect to FIG. 8F.

Figure 8F:
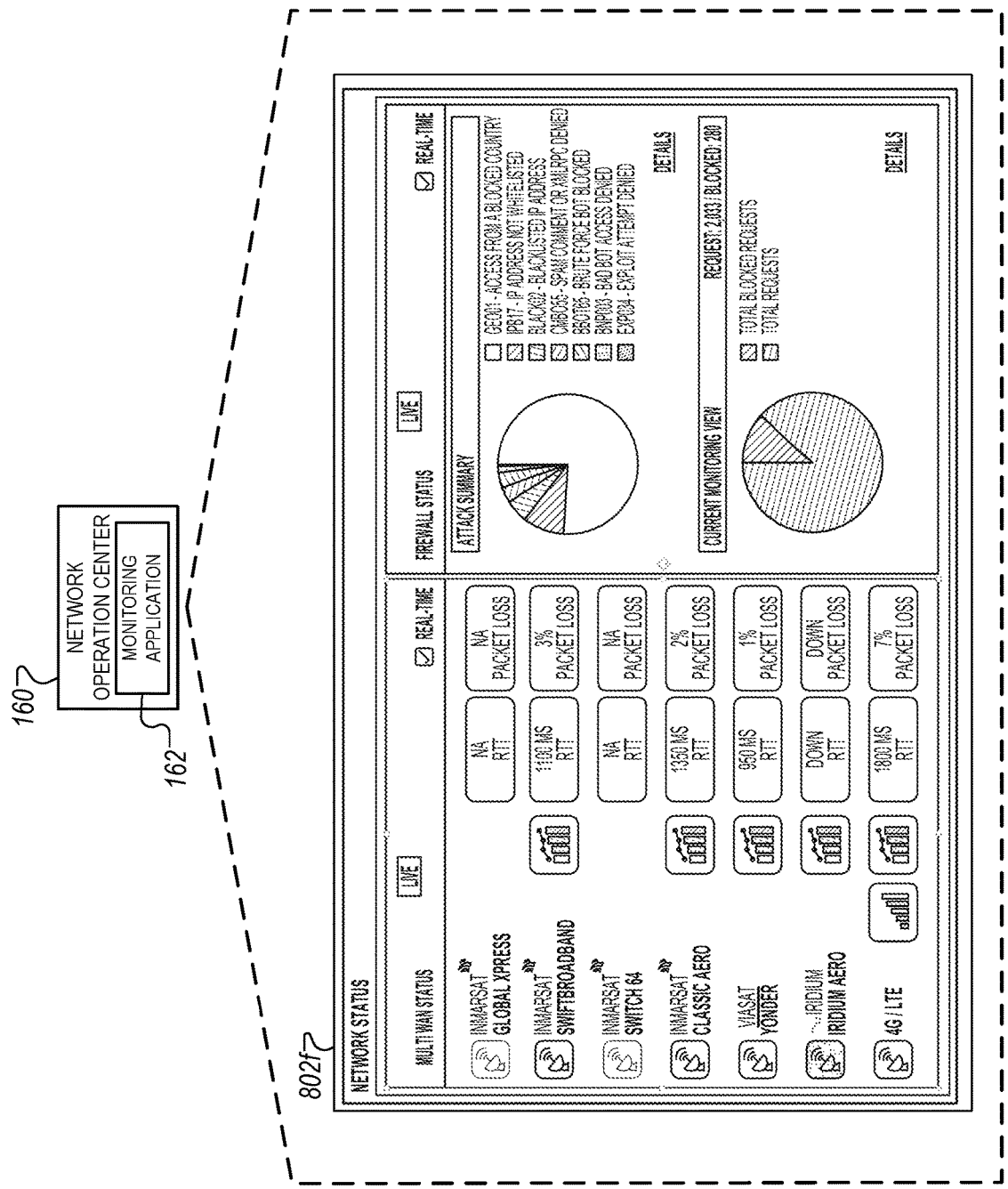

Referring now to FIG. 8F, another example of an interface 802f for monitoring multiple access points of the satellite network 100A is depicted. A system administrator can use the interface 802e to monitor network activity data and network performance data for multiple network access points provided through the cabin router 172. For instance, the system administrator can access a set of summary network performance statistics collected in real-time for each network access point (e.g., signal strength, a round-trip delay time (RTT), and/or a packet loss percentage). These summary network performance statistics can be used to indicate the relative performance difference between multiple network access points that are provided through the cabin router 172. In the example depicted, the summary network performance statistics represent network performance associated with an individual cabin router.

Figure 8G:
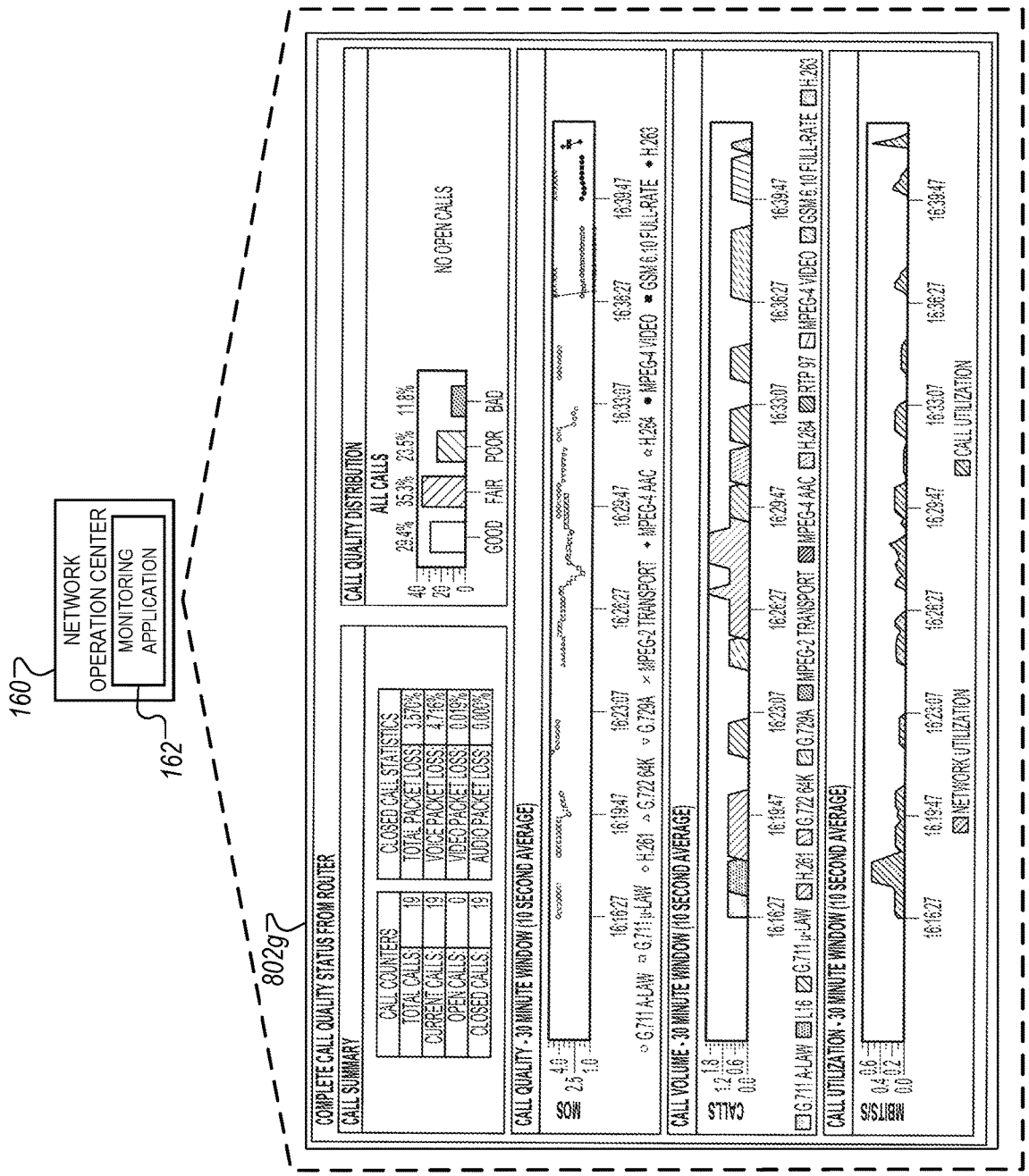

Referring now to FIG. 8G, an example of an interface 802g for monitoring call quality of telecommunication services provided through the satellite network 100A is depicted. A system administrator can use the interface 802g to monitor data collected by, for example, the cabin router 172. As shown in the figure, the monitoring data can include call statistics for all calls (e.g., total numbers of calls, current calls, open calls, closed calls) and closed calls (e.g., total packet loss, voice packet loss, video packet loss, and audio packet loss).

The interface 802g also includes visualizations that are generated based on performing pattern recognition analyses on the monitored data. For example, the system 100A can compute a call quality metric based on combining various call statistics such as percentage of audio packets lost, average transmission speed, among others. Call quality metrics can be assigned to each call placed over the satellite network 100A over a period of time and represented as a histogram based on a set of ranges corresponding to a quality categorization (e.g., "GOOD," "FAIR," "POOR," "BAD," etc.).

Other visualizations that are presented on the interface 802g can track the change in a call parameter over a specified period of time (e.g., ten-second period of time). For example, as depicted in FIG. 8G, the tracked call parameters can include the mean opinion quality (MOS) for different codecs used to encode audio data of the call, a number of calls associated with each codec, and network utilization represented as the change in data transmission over a period of time.

Figure 9:
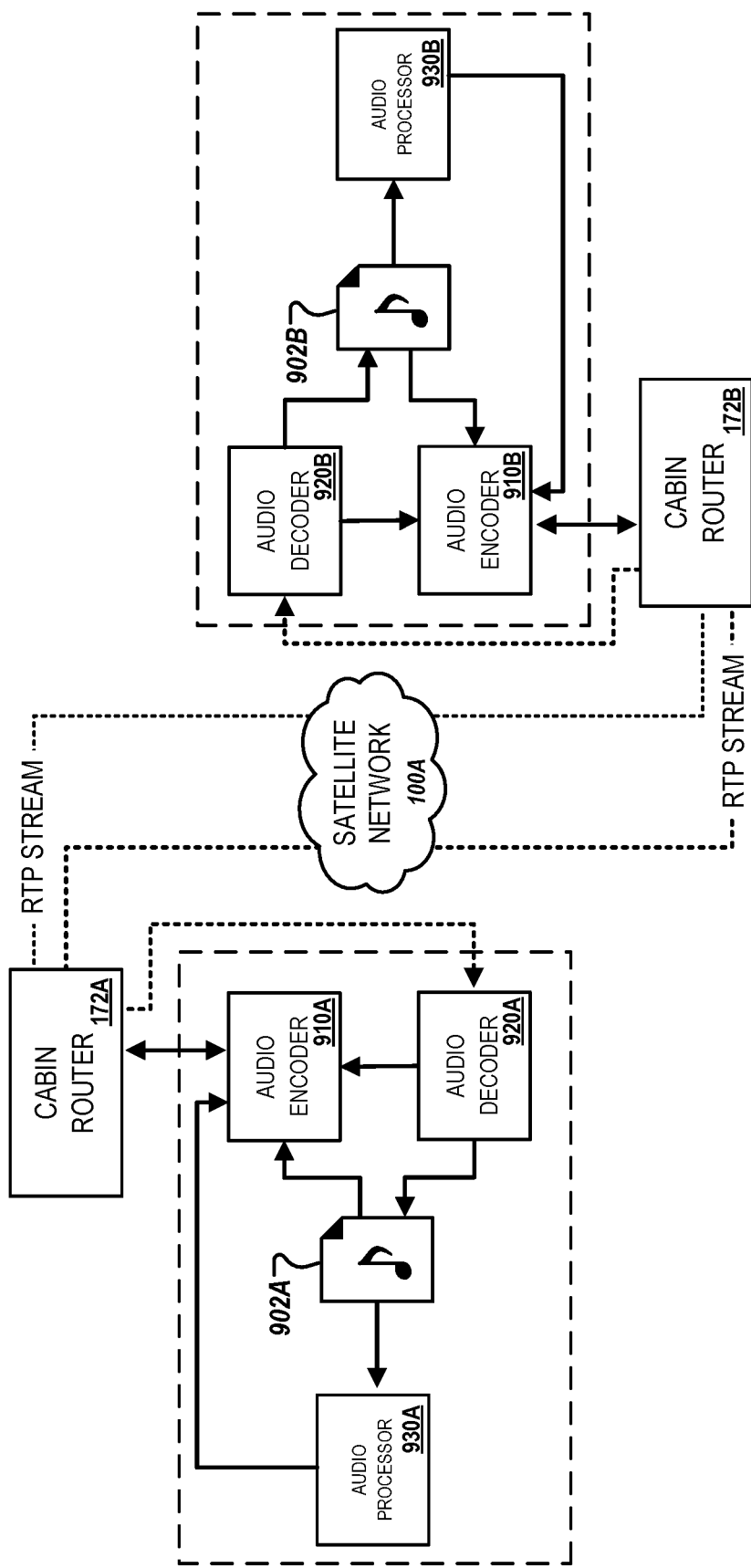
FIG. 9 is a schematic diagram that illustrates an example of a codec used to encode audio data transmitted over a satellite network.

FIG. 9 is a schematic diagram that illustrates an example of a codec architecture used to encode audio data transmitted over a satellite network. In the example depicted, encoded audio data is transmitted over the satellite network 100A between cabin routers 172A and 172B. In this example, the cabin routers 172A and 172B can be included in different aircraft, which therefore enables voice and video communications between devices that are on board the aircraft. In other examples, similar audio encoding, decoding and transmission techniques can be applied for other types of communications (e.g., transmissions between a cabin router on board an aircraft and an associated server).

In general, the codec used to encode audio data that is transmitted between the cabin routers 172A and 172B enables dynamic packet adjustment in order to maintain audio fidelity over varying network conditions of a satellite network such as the satellite network 100A. As described in detail below, the codec enables audio data to be encoded with dynamically adjustable bitrates, audio bandwidth, and sampling rates. In some implementations, the codec enables packet loss concealment (PLC) to improve user's perception of audio data when packet loss does occur over the satellite network 100A.

Referring to the architecture depicted in FIG. 9, the cabin router 172A includes an audio encoder 910A, an audio decoder 920A, and an audio processor 930A. The cabin router 1728 includes an audio encoder 9108, an audio decoder 930B, and an audio processor 930B. In the example depicted in the figure, the components of the cabin routers 172A and 1728 generally perform the same functions using the audio codec. For example, the audio encoders 910A and 910B encode audio data that is provided for output, the audio decoders 920A and 920B decode audio data that is received as input, the audio processors 930A and 930B adjusting encoding procedures performed by the audio encoders 910A and 910B, respectively, to enable dynamic encoding techniques described in detail below.

In the example depicted in FIG. 9, audio data 902A is encoded by the audio encoder 910B of the cabin router 172B and transmitted to the cabin router 172A over the satellite network 100A. The audio data 902A is then decoded by the audio decoder 920A of the cabin router 172A and processed by the audio processor 930A as described in detail below. In the other example, audio data 902B is encoded by the audio encoder 910A of the cabin router 172A and transmitted to the cabin router 172B over the satellite network 100A. The audio data 902B is then decoded by the audio decoder 920B of the cabin router 1728 and processed by the audio processor 930B. The data can transmitted over the satellite network 100A using a real-time transport protocol (RTP) stream for delivering audio and video over an IP network such as the satellite network 100A.

The codec used to encode the audio data 902A and 902B can operate, for example, up to a 48 kilohertz (KHz) sampling rate, which enables the use of variable sampling rates based on compression without substantial quality loss due to unsampling (e.g., quality reduction that is imperceptible to a user). This feature of the codec also achieves the production of high fidelity audio data when available bandwidth over the satellite network 100A is underutilized. During instances where available bandwidth over the satellite network 100A is low (e.g., 2.4 kilobytes per second (kbps)), the sampling rate of the codec can be reduced to prevent disruptions in packet transfer during an ongoing audio conference. Examples of different sampling rates that can be applied based on the bandwidth of the satellite network are provided in table 1 below:

| Sampling Rate (kHz) | Bitrate (kpbs) |
| --- | --- |
| 8 | 2.5-3; 6 |
| 12 | 7 |
| 16 | 8-17 |
| 24 | 18-23 |
| 48 | 24-32 |

TABLE 1

Bitrate vs. sampling rate for encoding audio data over a satellite network.

The audio encoders 910A-B and/or the audio processors 930A-B are also capable of using other techniques to during the encoding process to improve audio quality of the encoded data to be transmitted during times of limited network bandwidth. For example, the audio encoders 910A-B and/or the audio processors 930A-B can vary packet size and/or audio bandwidth dynamically based on the network bandwidth. This adjustment can occur, for example, fifty times per second, which enables packet generation to dynamically adjust to the real-time network performance associated with the satellite network 100A.

During an exemplary encoding process, the encoders 910A-B receive various types of data that is then used to determine the appropriate encoding parameters. Such data can include monitoring data collected in real-time for the satellite network 100A (e.g., bit-rate error, round-trip delay, continuity of connectivity, forward and reverse link capacity, CPU and memory capacity, data loss sources, etc.). The data also includes monitoring data collected by the cabin router, the audio processing module, and the audio decoder module. The encoders 910A-B process the received data to identify encoding parameters based on the processing the obtained data.

In some implementations, the dynamic encoding techniques described above can be used to address network performance issues due to packet loss and/or network congestion. Generally, packet loss over a satellite network can be segmented to two types of causes—packet loss due to network congestion and packet loss due to non-congestion. The codec described herein addresses these two issues separately.

For example, with respect to packet loss due to non-congestion, the codec decreases the voice packet segment duration to increase the overall packet throughput. This decreases the amount of voice segment that is lost per packet, which, along with the packet loss concealment (PLC) feature provide a consistent user experience during time periods of inconsistent network performance.

In another example, with respect to packet loss due to congestion, the codec throttles down the packet throughput by increasing the voice packet segment over time as congestion continues. This technique provides the satellite network with more time to return to a more stable network performance. In addition, the codec includes advanced error correction features. For example, a correlation between audio frames can be adjusted, which controls how loss of audio frames affects voice quality. The codec can also be applied to provide on-demand Forward Error Correction (FEC), which functions by inserting redundant data (at the cost of some quality) to reduce the effect of packet loss.

The use of the codec to encode audio data 902A-B provides various other types of advantages compared to use of common codecs. For instance, many stream codecs function explicitly on a narrow-band, wide-band or full-band only, which inherently makes their application during an encoding process rigid terms of voice quality. These common codecs therefore are susceptible to having a pre-determined voice quality has even before a call is made (e.g., regardless of present network performance). Using these codecs, once a call is established, the voice quality cannot be improved relative to the call quality when the call was initially placed. Performance is further limited if bandwidth is constrained, which, if using common codecs, causes encoders to attempt to output audio data of the same quality audio at a certain bandwidth, which often reduces audio quality further as the satellite network is unable support this surplus demand.

As described above with respect to table 1, the codec described herein functions with the full range of bands, starting from 8 kHz (e.g., the narrowband of compatible old telephony units) to 48 kHz (e.g., bandwidth that supports high fidelity professional audio music). The application of the codec during the encoding process therefore enables the audio encoders 910A-B to provide, for example, high quality voice data during both time periods of strong network performance and weak network performance. The real-time dynamic adjustment techniques described above reduce the likelihood that a user will perceive differences in audio quality due to changes in network performance.

Figure 10:
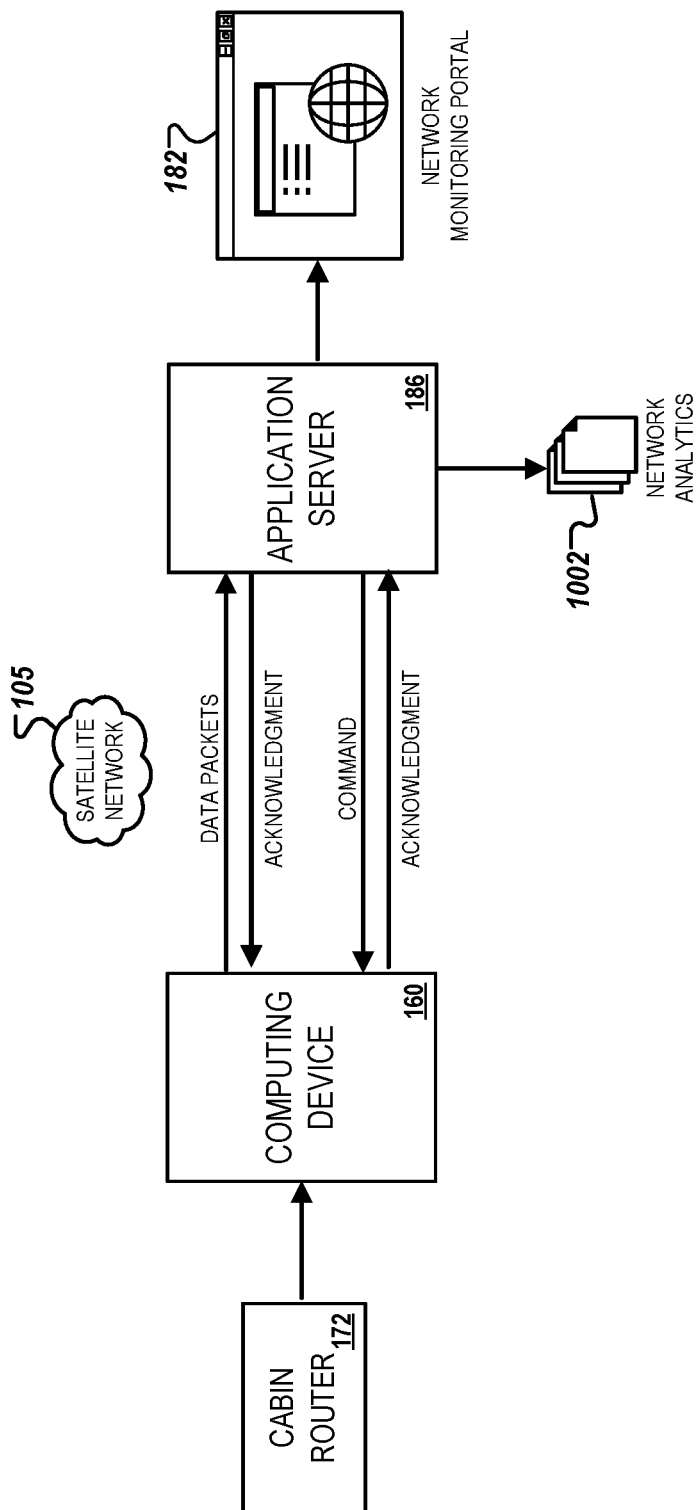
FIG. 10 is a schematic diagram that illustrates an example of communications that are exchanged between a client device on board aircraft and an application server associated with the network operations station.

FIG. 10 is a schematic diagram that illustrates an example of communications that are exchanged between the computing device 160 on board the aircraft 120 and an application server 186 associated with the network operations station 180. In the example depicted, data exchanged between the computing device 160 and the application server 186 are in a message format that reduces overall bandwidth transmitted over the satellite network 100A.

In general, communications between the computing device 160 and the applications server 186 over the satellite network 100A are implemented using a specialized communication protocol that is specifically designed for transmissions over satellite networks and for use in narrow bandwidth networks. For example, data packets exchanged between the computing device 160 and the application server 186 are formatted such that processing times by receiving devices is reduced, thereby improving the transmission and/or reception efficiency over the satellite network 100A, especially during times of limited network performance (e.g., limited available network bandwidth).

In some implementations, the message format of data packets is a user datagram protocol (UDP) packet that includes an "IP_HEADER" section of 28 bytes and a "CLIENT_PACKET" of maximum 1472 bytes. The "CLIENT_PACKET" portion identifies data fields such as a sequence number, a timestamp, a tail number, a device identifier, a packet length, and a "PACKET" subsection. The "PACKET" subsection further includes data sub-fields such as a command identifier, a packet length (LSB), a packet length (MSB), and packet data with a maximum of 11200 bytes.

Figure 11:
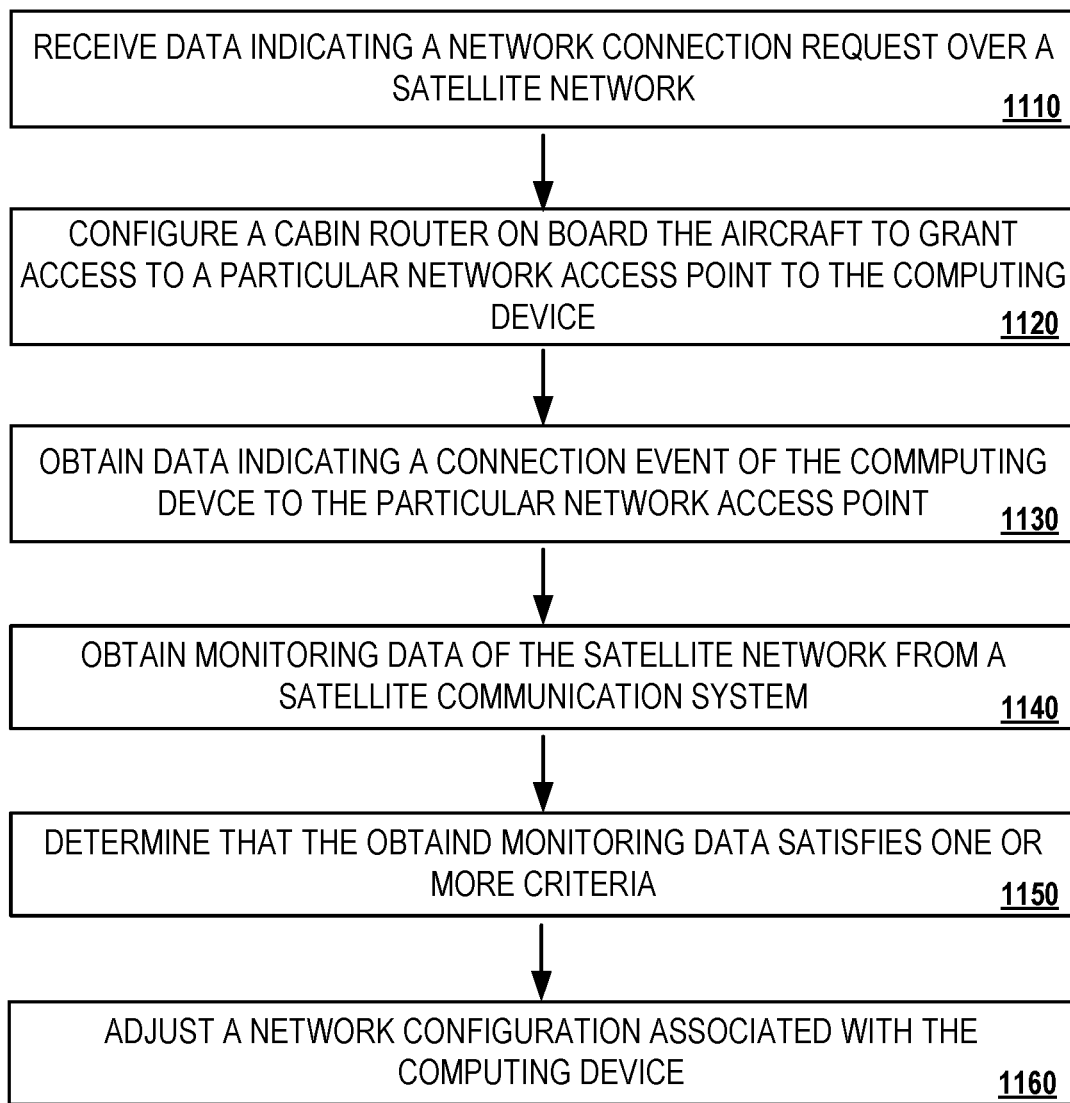
FIG. 11 is a flowchart of an example of a process for dynamically adjusting a network access point of a satellite network based on converged data communications.

The communication protocol depicted in FIG. 10 can be used to reduce the amount of data that is transmitted over the satellite network 100A compared to many other satellite communication protocols. For example, many satellite communication protocols often require the transmission of large data log files with each packet transmission over the satellite network, which imposes a high network usage costs. In contrast, the communication protocol depicted in FIG. 10, limits the bandwidth associated with each transmission to, for example, 1500 bytes, between the computing device 160 and the terrestrial communication station 110. Essential data such as monitoring data (e.g., network connectivity data, network performance data, etc.) is exchanged periodically (e.g., every 30 minutes) between the computing device 160 and the terrestrial communication station 110 such that essential data the monitoring data is used to identify present network conditions over the entire time period during which the computing device 160 accesses network services provisioned over the satellite network 100A. FIG. 11 is a flowchart of an example of a process 1100 for dynamically adjusting a network access point of a satellite network based on converged data communications. Briefly, the process 1100 can include the operations of receiving data indicating a network connection request over a satellite network (1110), configuring a cabin router on board the aircraft to grant access to particular network access point to the computing device (1120), obtaining data indicating a connection event of the computing device to the particular network access point (1130), obtaining monitoring data of the satellite network from a satellite communication system (1140), determining that the obtained monitoring data satisfies one or more criteria (1150), and adjusting a network configuration associated with the computing device (1160).

The operations of the process 1100 can be performed by one or more components of the system 100B as depicted and described above with respect to FIG. 1B. For example, the operations can be performed by one or more of the cabin communication module 170, the terrestrial communication station 110, and/or the network operation station 180. In some implementations, processing operations can be performed by an application server associated with one or more of the components of the system 100B. The application server can include one or more processors and instructions stored on a non-transitory computer-readable medium that, when executed, cause the one or more processors to perform the operations included in the process 1100.

In more detail, the process 900 can include the operation of receiving data indicating a network connection request over a satellite network (1110). For instance, the terrestrial communication station 110 can receive data indicating a network connection request over the satellite network 100A. The network connection request can be submitted by the computing device 160 on board the aircraft 120 to the cabin communication module 170.

The process 1100 can include the operation of configuring a cabin router on board the aircraft to grant access to particular network access point to the computing device (1120). For instance, the terrestrial communication station 110 can configure the cabin router 172 of the cabin communication module 170 to grant access to the computing device 170 to a particular network access point of the satellite network 100A. As described above, the satellite network 100A can be associated with multiple network access points (e.g., network tails). In some instances, different network access points are each associated with a different SATCOM service provider (e.g., the SATCOM providers 150A, 1506, and 150C). In other instances, different network access points are determined based on different airborne communication protocols used to transmit data over the satellite network 100A. Once access is granted to the network access point, the computing device 160 is then capable of exchanging communications with the terrestrial communication station 110 over the satellite network 100A.

The process 1100 can include the operation of obtaining data indicating a connection event of the computing device to the particular network access point (1130). For instance, the terrestrial communication station 110 and/or the network operation station 180 can obtain data indicating a connection event of the computing device 160 to the network access point of the cabin router 172. The connection event can represent, for example, the computing device 160 initiating a voice call through the cabin communication module 170. In other examples, the connection event can represent the computing device 160 accessing one or more network services 152 (e.g., mobile roaming, texting, PTSN calls, etc.) that are provisioned by the SATCOM providers 150A-C.

The process 1100 can include the operation of obtaining monitoring data of the satellite network from a satellite communication system (1140). For instance, the terrestrial communication station 110 and/or the network operation station 180 may obtain monitoring data of the satellite network 100A that is collected in real-time as described above. As depicted in FIGS. 8A-G, the monitoring data can include network performance data, network connectivity data, network usage data, among others.

As described above, the obtained monitoring data is collected based on converged data communications between the components of the system 1006. For example, because data collected by the components of the system 100B in relation to the satellite network 100A is processed and/or aggregated collectively, the monitoring data can be used to indicate real-time network conditions (e.g., available network bandwidth), real-time network performance (e.g., upload and download speeds), and service quality metrics for network services accessed over the satellite network 100A (e.g., call quality metrics for voice calls made over the satellite network 100A).

The process 1100 can include the operation of determining that the obtained monitoring data satisfies one or more criteria (1150). For instance, the terrestrial communication station 110 and/or the network operation station 180 may determine that the obtained monitoring data satisfies criteria associated with network performance, network conditions, and/or network service quality. Examples of such determinations can include determining that a network access point is currently offline, determining that available network bandwidth is below the required bandwidth to provision certain network services, determining that service quality has reduced below a particular threshold quality metric.

The process 1100 can include the operation of adjusting a network configuration associated with the computing device (1160). For instance, the terrestrial communication station 110 and/or the network operation station 180 can adjust a network configurations associated with the computing device 120 in response to determining that the monitoring data of the satellite network 100A satisfies one or more criteria. In some instances, the adjustment is performed manually (e.g. based on a user input provided by a system administrator on one or more of the user interfaces depicted in FIGS. 8A-G.). For example, an adjustment can change to an tail assigned to the computing device specified by the system administrator. In other instances, the adjustment can be made automatically (e.g., without any user intervention). For example, as described above with respect to FIG. 9, a decrease in current network performance (e.g., bitrate) can be used to decrease the sampling rate of a code used to encode audio data transmitted over the satellite network 100A for an ongoing voice call. In this example, the encoding technique is adjusting automatically by an audio encoder of the cabin router 172 without any user intervention.

Figure 12:
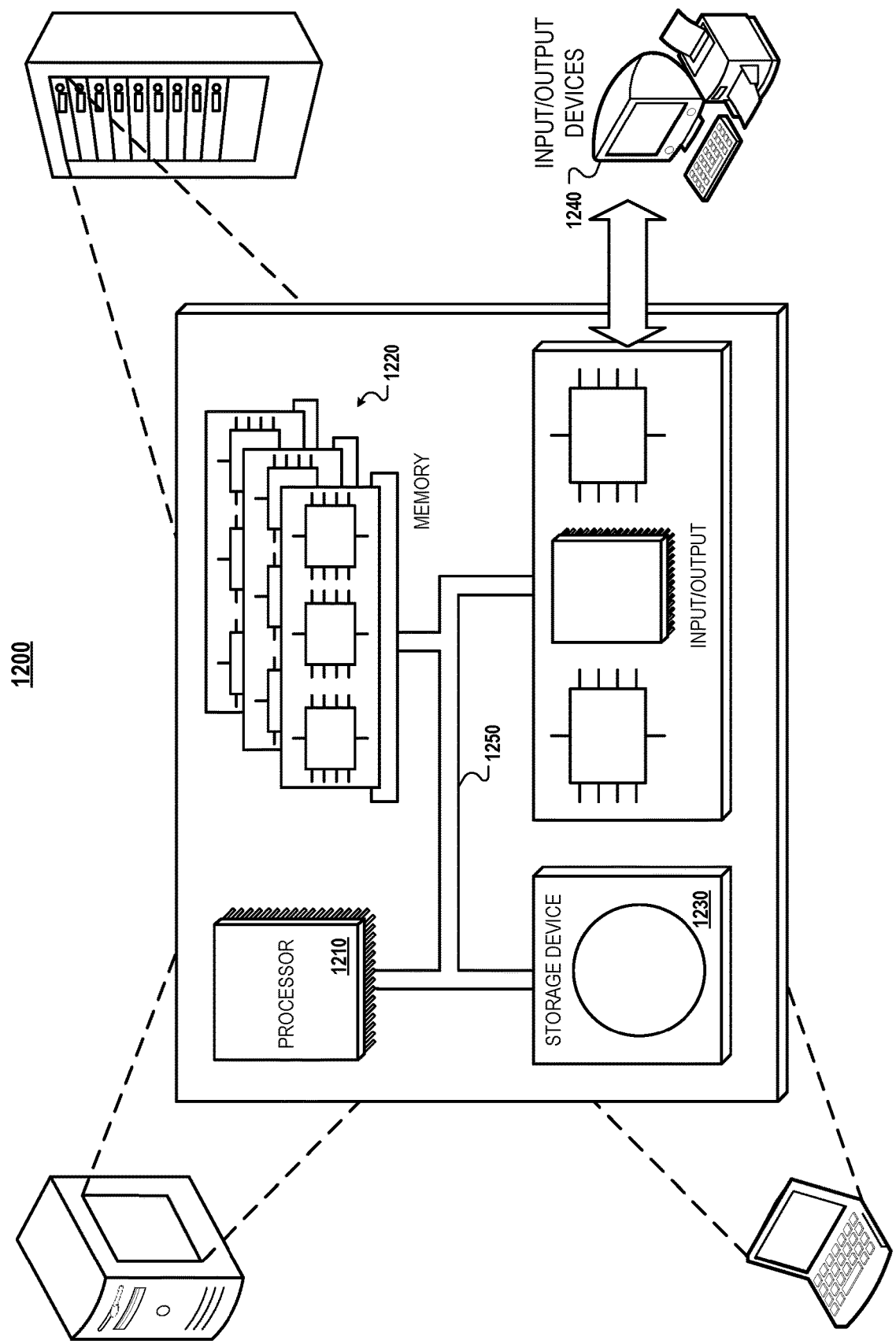
FIG. 12 is a block diagram of computing devices on which the processes described herein, or potions thereof, may be implemented.

FIG. 12 is a schematic diagram of a computer system 1200. The system 1200 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 1200) and their structural equivalents, or in combinations of one or more of them. The system 1200 is intended to include various forms of digital computers, such as laptops, desktops, workstations, personal digital assistants, servers, blade servers, mainframes, and other appropriate computers, including vehicles installed on base units or pod units of modular vehicles. The system 1200 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 1200 includes a processor 1210, a memory 1220, a storage device 1230, and an input/output device 1240. Each of the components 1210, 1220, 1230, and 1240 are interconnected using a system bus 1240. The processor 1210 is capable of processing instructions for execution within the system 1200. The processor may be designed using any of a number of architectures. For example, the processor 1210 may be a CISC (Complex Instruction Set Computers) processor, a RISC (Reduced Instruction Set Computer) processor, or a MISC (Minimal Instruction Set Computer) processor.

In one implementation, the processor 1210 is a single-threaded processor. In another implementation, the processor 1210 is a multi-threaded processor. The processor 1210 is capable of processing instructions stored in the memory 1220 or on the storage device 1230 to display graphical information for a user interface on the input/output device 1240.

The memory 1220 stores information within the system 1200. In one implementation, the memory 1220 is a computer-readable medium. In one implementation, the memory 1220 is a volatile memory unit. In another implementation, the memory 1220 is a non-volatile memory unit.

The storage device 1230 is capable of providing mass storage for the system 1200. In one implementation, the storage device 1230 is a computer-readable medium. In various different implementations, the storage device 1230 may be a floppy disk device, a hard disk device, an optical disk device, or a tape device.

The input/output device 1240 provides input/output operations for the system 1200. In one implementation, the input/output device 1240 includes a keyboard and/or pointing device. In another implementation, the input/output device 1240 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, by a server, an indication that a computing device on board an aircraft has established a connection to a network access point associated with the aircraft, wherein:
      the server is configured to provide a software framework enabling converged data communications between a plurality of devices providing services over a satellite network, and
      the software framework comprising a first software agent running on a network access point of the aircraft and a second software agent running on a terrestrial station associated with the satellite network, wherein each of the first software agent and the second software agent are configured to enable bilateral data communications with the server over the satellite network;
   obtaining, by the server and from the first software agent, first packet data from the first software agent of the network access point
   obtaining, by the server and from the second software agent, second packet data from the second software agent of the terrestrial station;
   computing, by the server and based on the first packet data and the second packet data, one or more performance parameters associated with traffic data of the satellite network;
   determining that the traffic data satisfies one or more criteria associated with the satellite network based on the one or more performance parameters; and
   adjusting a network configuration associated with the computing device based at least on the traffic data.

2. The method of claim 1, wherein:
   the traffic data indicates a change in available bandwidth over the network access point; and
   adjusting the network configuration comprises adjusting a dynamic bandwidth allocation over the network access point assigned to the computing device.

3. The method of claim 1, wherein:
   determining that the traffic data satisfies the one or more criteria associated with the satellite network comprises determining that the network access point is currently disconnected from the satellite network; and
   adjusting the network configuration associated the computing device comprises reconfiguring a cabin router on board the aircraft to grant access a different network access point of the satellite network to the computing device.

4. The method of claim 3, wherein:
the data indicating that the computing device has connected to the network access point comprises a request by the computing device to initiate a voice call over the satellite network;
configuring the cabin router to grant access to the network access point comprises configuring the cabin router to initiate the voice call requested by the computing device over the network access point.

5. The method of claim 4, wherein:
the traffic data indicates a call quality monitored in real-time over the network access point;
determining that the traffic data satisfies the one or more criteria associated with the satellite network comprises determining that the call quality does not to satisfy a threshold call quality; and
adjusting the network configuration associated with the computing device comprises increasing a dynamic bandwidth allocation assigned to the computing device over the network access point.

6. The method of claim 4, further comprising:
dynamically encoding audio data corresponding to the voice call over the satellite network using a particular audio codec, the particular audio codec enabling at least a variable sampling rate of the audio data based on the traffic data.

7. The method of claim 1, further comprising:
scanning the satellite network for a set of predetermined security vulnerabilities in real-time;
determining that one or more security vulnerabilities from the set of predetermined security vulnerabilities presently impact network performance of the satellite network;
assigning a respective severity score to each of the one or more determined security vulnerabilities; and
storing, in a database associated with the plurality of devices, data indicating the security vulnerabilities and the respective severity scores assigned to each security vulnerability.

8. The method of claim 1, wherein:
the plurality of devices are configured to provision telecommunication services to a first aviation service provider and a second aviation service provider;
the first aviation service provider using a first set of communication devices associated with a first hardware configuration;
the second aviation service provider using a set second of communication devices associated with a second hardware configuration, the second hardware configuration employing a different communication protocol than a communication protocol employed by the first hardware configuration.

9. A system comprising:
one or more computing devices; and
one or more storage devices that store instructions that, when executed by the one or more computing devices, causes the one or more computing devices to perform operations comprising:
receiving, by a server, an indication that a computing device on board an aircraft has established a connection to a network access point associated with the aircraft, wherein:
the server is configured to provide a software framework enabling converged data communications between a plurality of devices providing services over a satellite network, and
the software framework comprising a first software agent running on a network access point of the aircraft and a second software agent running on a terrestrial station associated with the satellite network, wherein each of the first software agent and the second software agent are configured to enable bilateral data communications with the server over the satellite network;
obtaining, by the server and from the first software agent, first packet data from the first software agent of the network access point
obtaining, by the server and from the second software agent, second packet data from the second software agent of the terrestrial station;
computing, by the server and based on the first packet data and the second packet data, one or more performance parameters associated with traffic data of the satellite network;
determining that the traffic data satisfies one or more criteria associated with the satellite network based on the one or more performance parameters; and
adjusting a network configuration associated with the computing device based at least on the traffic data.

10. The system of claim 9, wherein:
the traffic data indicates a change in available bandwidth over the network access point; and
adjusting the network configuration comprises adjusting a dynamic bandwidth allocation over the network access point assigned to the computing device.

11. The system of claim 9, wherein:
determining that the traffic data satisfies the one or more criteria associated with the satellite network comprises determining that the network access point is currently disconnected from the satellite network; and
adjusting the network configuration associated the computing device comprises reconfiguring a cabin router on board the aircraft to grant access a different network access point of the satellite network to the computing device.

12. The system of claim 11, wherein:
the data indicating that the computing device has connected to the network access point comprises a request by the computing device to initiate a voice call over the satellite network;
configuring the cabin router to grant access to the network access point comprises configuring the cabin router to initiate the voice call requested by the computing device over the network access point.

13. The system of claim 12, wherein:
the traffic data indicates a call quality monitored in real-time over the network access point;
determining that the traffic data satisfies the one or more criteria associated with the satellite network comprises determining that the call quality does not to satisfy a threshold call quality; and
adjusting the network configuration associated with the computing device comprises increasing a dynamic bandwidth allocation assigned to the computing device over the network access point.

14. The system of claim 12, wherein the operations further comprise:
dynamically encoding audio data corresponding to the voice call over the satellite network using a particular audio codec, the particular audio codec enabling at least a variable sampling rate of the audio data based on the traffic data.

15. The system of claim 9, wherein the operations further comprise:
- scanning the satellite network for a set of predetermined security vulnerabilities in real-time;
- determining that one or more security vulnerabilities from the set of predetermined security vulnerabilities presently impact network performance of the satellite network;
- assigning a respective severity score to each of the security vulnerabilities; and
- storing, in a database associated with the plurality of devices, data indicating the security vulnerabilities and the respective severity scores assigned to each security vulnerability.

16. The system of claim 9, wherein:
- the plurality of devices are configured to provision telecommunication services to a first aviation service provider and a second aviation service provider;
- the first aviation service provider using a first set of communication devices associated with a first hardware configuration;
- the second aviation service provider using a set second of communication devices associated with a second hardware configuration, the second hardware configuration employing a different communication protocol than a communication protocol employed by the first hardware configuration.

17. A non-transitory computer-readable storage device encoded with computer program instructions that, when executed by one or more computers, cause the one or more computers to perform operations comprising:
- receiving, by a server, an indication that a computing device on board an aircraft has established a connection to a network access point associated with the aircraft, wherein:
  - the server is configured to provide a software framework enabling converged data communications between a plurality of devices providing services over a satellite network, and
  - the software framework comprising a first software agent running on a network access point of the aircraft and a second software agent running on a terrestrial station associated with the satellite network, wherein each of the first software agent and the second software agent are configured to enable bilateral data communications with the server over the satellite network;
- obtaining, by the server and from the first software agent, first packet data from the first software agent of the network access point
- obtaining, by the server and from the second software agent, second packet data from the second software agent of the terrestrial station;
- computing, by the server and based on the first packet data and the second packet data, one or more performance parameters associated with traffic data of the satellite network;
- determining that the traffic data satisfies one or more criteria associated with the satellite network based on the one or more performance parameters; and
- adjusting a network configuration associated with the computing device based at least on the traffic data.

18. The device of claim 17, wherein:
- the traffic data indicates a change in available bandwidth over the network access point; and
- adjusting the network configuration comprises adjusting a dynamic bandwidth allocation over the network access point assigned to the computing device.

19. The device of claim 17, wherein:
- determining that the traffic data satisfies the one or more criteria associated with the satellite network comprises determining that the network access point is currently disconnected from the satellite network; and
- adjusting the network configuration associated the computing device comprises reconfiguring a cabin router on board the aircraft to grant access a different network access point of the satellite network to the computing device.

20. The device of claim 19, wherein:
- the data indicating that the computing device has connected to the network access point comprises a request by the computing device to initiate a voice call over the satellite network;
- configuring the cabin router to grant access to the network access point comprises configuring the cabin router to initiate the voice call requested by the computing device over the network access point.

* * * * *